US008170893B1

(12) United States Patent
Rossi

(10) Patent No.: US 8,170,893 B1
(45) Date of Patent: May 1, 2012

(54) ELIMINATING SOURCES OF MAINTENANCE LOSSES

(76) Inventor: Sergio J Rossi, Mansfield, TX (US)

( * ) Notice: Subject to any disclaimer, the term of this patent is extended or adjusted under 35 U.S.C. 154(b) by 1425 days.

(21) Appl. No.: 11/548,924

(22) Filed: Oct. 12, 2006

(51) Int. Cl.
*G06Q 10/00* (2006.01)

(52) U.S. Cl. .................................................. 705/7.11

(58) Field of Classification Search .................. 705/7.11
See application file for complete search history.

(56) References Cited

U.S. PATENT DOCUMENTS

| | | | | |
|---|---|---|---|---|
| 4,943,919 | A * | 7/1990 | Aslin et al. | 701/3 |
| 5,216,612 | A * | 6/1993 | Cornett et al. | 700/96 |
| 6,128,543 | A * | 10/2000 | Hitchner | 700/108 |
| 6,463,441 | B1 * | 10/2002 | Paradies | 1/1 |
| 6,738,748 | B2 * | 5/2004 | Wetzer | 705/9 |
| 7,440,906 | B1 * | 10/2008 | Wetzer et al. | 705/8 |
| 7,457,762 | B2 * | 11/2008 | Wetzer et al. | 705/8 |
| 7,557,702 | B2 * | 7/2009 | Eryurek et al. | 340/511 |
| 2002/0035495 | A1 * | 3/2002 | Spira et al. | 705/7 |
| 2002/0049563 | A1 * | 4/2002 | Vetter et al. | 702/184 |
| 2002/0161614 | A1 * | 10/2002 | Spira et al. | 705/7 |
| 2004/0176929 | A1 * | 9/2004 | Joubert et al. | 702/184 |
| 2005/0007249 | A1 * | 1/2005 | Eryurek et al. | 340/511 |
| 2006/0248118 | A1 * | 11/2006 | Curtis et al. | 707/104.1 |
| 2007/0050221 | A1 * | 3/2007 | Singh et al. | 705/7 |

OTHER PUBLICATIONS

Arabe, Katrina C. "Aerospace Job Shop Reveals Secrets for Success." ThomasNet News—Industry Market Trends Newsletter, Feb. 2004 <http://news.thomasnet.com/IMT/archives/2004/02/aerospace_job_s.html>.*
Albert, Mark."This Shop Really Shines . . . And Sorts, Simplifies, Standardizes and Sustains." Modern Machine Shop, Dec. 2003, <http://www.mmsonline.com/articles/this-shop-really-shinesand-sorts-simplifies-standardizes-and-sustains>.*
Chenaski, Wayne."Making 5S Stick in Your Shop." Modern Machine Shop, Jul. 2004 <http://www.mmsonline.com/columns/making-5s-stick-in-your-shop>.*
Wauters, Francis and Mathot, Jean."OEE Overall Equipment Effectiveness." Jun. 2002, <http://www05.abb.com/global/scot/scot296.nsf/veritydisplay/4581d5d1ce980419c1256bfb006399b9/$file/3BUS094188R0001.pdf_-_en_OEE_Whitepaper_-_Overall_Equipment_Effectiveness.pdf>.*
Albert, Mark."This Shop Really Shines . . . And Sorts, Simplifies, Standardizes and Sustains." Modern Machine Shop, Dec. 2003, http://www.mmsonline.com/articles/this-shop-really-shinesand-sorts-simplifies-standardizes-and-sustains.*
Wurzbach, Richard N."A web-based cost benefit analysis method for predictive maintenance." Feb. 2002, <http://www.mrgcorp.com/wp_files/cba_pdm25.pdf>.*
STIC EIC Search Report Nov. 29, 2011.*
Al-Najjar and Alsyouf, Imad. "Enhancing a Company's Profitability and Competiteness Using Integrated Vibration-based Maintenance: A case study." European Journal of Operational Research, vol. 157, Issue 3, Sep. 16, 2004, pp. 643-657.*

(Continued)

*Primary Examiner* — Beth V Boswell
*Assistant Examiner* — Renae Feacher

(57) ABSTRACT

Processes and software are provided for eliminating sources of maintenance losses in machine intensive environments such as manufacturing, processing and assembly plants.
The processes and software include creating financial and work order metrics to trend maintenance variables, a process for creating work orders, a process for using alarms for integrating measurement technologies and spare parts, a process for managing repair and replacing activities and projects by improving documenting and communicating processes while involving users such as executives and senior managers.

11 Claims, 9 Drawing Sheets

OTHER PUBLICATIONS

Javid Koochaki, Jos Bokhorst, Hans Wortmann, & Warse Klingenberg. (2011). Evaluating condition based maintenance effectiveness for two processes in series. Journal of Quality in Maintenance Engineering, 17(4), 398-414. Retrieved Nov. 30, 2011, from ABI/INFORM Global. ( Document ID: 2497669191).*

Hajime Yamashina, & Shunsuke Otani. (2001). Optimal preventive maintenance planning for multiple elevators. Journal of Quality in Maintenance Engineering, 7(2), 128-150. Retrieved Nov. 30, 2011, from ABI/INFORM Global.*

Fonseca, Daniel J."A knowledge-based system for preventive maintenance." Expert System, vol. 17, Issue 5, pp. 241-247, Nov. 2000.*

'Lean tools' and practices from Japan. (Nov. 2, 2005,). The Bangkok Post,p. 1. Retrieved Nov. 30, 2011, from ProQuest Newsstand.*

Hart, Greg. "Make workspaces come alive with 5S visual systems." IIE Annual Solutions Conference, May 23, 2006.*

Proquest Search Nov. 30, 2011.*

EBSCO Search Nov. 30, 2011.*

Wauters, Francis and Mathot, Jean."OEE Overall Equipment Effectiveness." Jun. 2002, <http://www05.abb.com/global/scot/scot296.nsf/veritydisplay/4581d5d1ce980419c1256bfb006399b9/$file/3BUS094188R0001.pdf_-_en_OEE_Whitepaper_-_Overall_Equipment_Effectiveness.pdf>.*

Albert, Mark."This Shop Really Shines . . . And Sorts, Simplifies, Standardizes and Sustains." Modern Machine Shop, Dec. 2003, http://www.mmsonline.com/articles/this-shop-really-shinesand-sorts-simplifies-standardizes-and-sustains.*

Wurzbach, Richard N."A web-based cost benefit analysis method for predictive maintenance." Feb. 2002, <http://www.mrgcorp.com/wp_files/cba_pdm25.pdf>.*

* cited by examiner

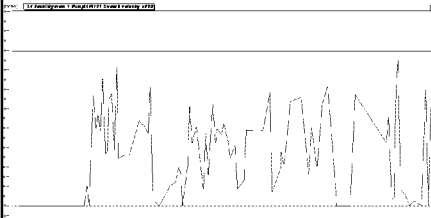

| Plant: | XYZ Inc. | Type of Task: | Wear Origin: |
| --- | --- | --- | --- |
| Line: | 4 | | |
| System: | Hydraulic | R&R | Machine wear |
| Subsystem: | | Measure | Process/Material related: |
| Component: | Pump | Improve | Human Error: |

| Reliability Engineer: | |
| --- | --- |
| Trend Confirmation: Yes No | Consequences of inaction: Higher repair losses: |
| Complimentary Technology: Oil Analysis: | Higher probability of downstream equipment losses: |
| Ultrasonic: Infrared (temp): | Higher probability of upstream equipment losses: |
| Pressure: Amperage: Load: | Higher probability of internal component losses: |

COST OF NO ACTION:

| | |
| --- | --- |
| Loss Probability due to Reactive R&R: | |
| Loss/Profit Probability due to Maintenance Planning R&R: | |
| Profit Probability due to Production Scheduling R&R: | |
| PROFITS PROBABILITY: | |

Replacement Cost:

Manager Responsible R&R WO:      John Doe      Approved      Denied

Manager Responsible for Scheduling R&R WO:      Billy Doe      Approved      Denied

| Metrics: | SMP&L: |
| --- | --- |
| | HMP&L |
| | TMP&L: |
| | VMP&L: |
| | DMP&L: |

ELIMINATING SOURCES OF MAINTENANCE LOSSES

CROSS REFERENCE TO RELATED APPLICATIONS

U.S. Pat. No. 7,006,878 to Schweizerhof, et al. (2006)
U.S. Pat. No. 7,010,386 to McDonnell, et al. (2006)
U.S. Pat. No. 7,017,857 to Hill, et al. (2006)
U.S. Pat. No. 7,003,409 to Hepner, et al. (2006)
U.S. Pat. No. 6,985,779 to Hsiung, et al. (2006)
U.S. Pat. No. 6,973,413 to Hashemian (2005)
U.S. Pat. No. 6,968,259 to Simons, et al. (2005)
U.S. Pat. No. 6,965,806 to Eryurek, et al. (2005)

STATEMENT REGARDING FEDERALLY SPONSORED RESEARCH OR DEVELOPMENT

NA

REFERENCE TO SEQUENCE LISTING, A TABLE, OR A COMPUTER PROGRAM LISTING COMPACT DISC APPENDIX

NA

BACKGROUND OF THE INVENTION

The present invention relates to processes and software for eliminating sources of maintenance losses, specifically to processes and software for eliminating sources of maintenance losses in manufacturing, processing and assembly plants.

DESCRIPTION OF PRIOR ART

Components such as bearings, gearboxes, pumps, compressors and others do wear out creating machinery breakdowns.

These breakdowns create maintenance and production losses which severely affects the productivity of manufacturing plants.

When components break down they need to be repaired or replaced immediately to avoid incurring higher losses. The repair and replacement (R&R) activities when reacting to breakdowns, still prevalent in today's manufacturing environments, are known as reactive maintenance (RM). Work orders are typically written to authorize work on machines and to document the occurrence. Very seldom plants with RM develop work orders to avoid the breakdowns.

RM is difficult to eliminate, it is hard to manage as there is no accountability of the emergency activities which often leads to finger pointing and lack of communications between maintenance and production departments.

When breakdowns occur, the need to bring the machines up and running again is so intense that opportunities for learning from the occasion or avoiding the same failures from repeating again in the future are bypassed, not documented and shortly forgotten.

Maintenance losses increase when maintenance takes too long to answer calls or troubleshooting or waiting for a replacement part to be flown in from some distant manufacturer.

Maintenance losses increase when production overloads machines to increase the output temporarily, when an untrained operator or technician makes a mistake or when managers don't allow scheduled time for maintenance to repair a machine. In some cases executives see maintenance as an expense that must be minimized at all costs but don't provide the tools available to do so. Sometimes, it is all of the above combined what increases the losses creating a culture at a plant in which people are interested in maintaining the status quo.

The majority of manufacturing plants do know how much downtime they have. What they typically don't know is where the majority of the downtime is coming from, how to create work orders and how to manage maintenance processes. It is desirable to identify the sources of all maintenance losses for finding a solution to this high cost and its consequences.

In the past, maintenance losses have been approached from several different perspectives. This problem has been partially addressed by a broad variety of methodologies such as preventive maintenance (PM) also known as Time Based Maintenance (TBM), Predictive Maintenance (PdM), Total Productive Maintenance (TPM), Reliability Centered Maintenance (RCM), Root Failure Cause Analysis (RFCA) or Failure Mode and Effect Analysis (FMEA) and Lean Maintenance.

This problem has also been partially and indirectly approached by a broad variety of single or integrated technologies software packages for oil, vibration; infrared and ultrasonic analysis as well as Computerized Maintenance Management System software (CMMS) also known as Enterprise Asset Management (EAM) designed for managing PM, work orders, inventory and purchase ordering.

PM or TBM

Preventive or Time Based (PM or TBM) Maintenance is maintenance performed at fixed intervals of time. At times PM is better than Reactive Maintenance (RM) or Emergency Maintenance (EM) but at other times it creates more problems as errors could be introduced during the unnecessary repair and replacement activities. Very seldom you see a machine component that wears at a constant rate (ie. A fixed period of time like every six months). Some components will last longer than others and therefore it is impossible to exactly determine when a component will fail based on past or original equipment manufacturer (OEM) data.

The majority of PMs or TBMs are completed unnecessarily before the component wears out or not performed at all because the component failed prior to the scheduled PM. Needless to say that both situations (too early or too late) actually increase maintenance losses and that is one of the main reasons why this PM/TBM methodology is falling out of grace.

PdM

The application of PdM technologies such as vibration, infrared, ultrasonic and oil analysis provides a different perspective to maintenance as the wear can be closely monitored with these technologies. Once wear is detected then repair and replacement activities can be planned and scheduled before failure occurs actively eliminating maintenance losses.

Typically, the application of each technology is provided by different experts leaving the integration of all technologies up to the in-house plant engineers. This fragmented approach is very time consuming, confusing (one technology may say to shut down machine while another one may say the machine is ok), inefficient and expensive.

Only recently some of these technologies have been integrated in a meaningful manner by few consultants in the field and as a result recommendations for repair and replacement activities are based on more than one variable from one single technology. This provides the plant engineer with several tools to confirm that a component is wearing down and will fail unless it is removed or repaired.

Some OEM's have developed software to integrate these technologies to simplify the decision making process based on large quantities of data which results from implementing several of the PdM technologies.

While this integration reduces the analysis time and improves the precision in determining time to failure, none of the current service providers have integrated the technologies within a process or methodology that includes other sources of maintenance losses such as human error or process related failures. Human errors resulting from lack of training, lack of interdepartmental and executive communication, lack of learning and sharing troubleshooting experiences/hints are by far the most important of all maintenance losses yet, they are not addressed by either of the software currently available. This is evident when you see plants which use all of the technologies and CMMS but don't reach the results expected nor promised by vendors and consultants.

Classic or Modified RCM

Some model-based maintenance improvement methodologies such as the Classic and several Modified RCM programs are used exclusively to generate PM and PdM tasks. These programs are added as a component to existing methodologies such as TPM or Lean Manufacturing. The RCM approach uses a multi disciplinary team to perform FMEA or RFCA which heavily depends on the quantity, quality and accuracy of historical data collected and in the knowledge of team members and coordinator or consultant.

Manufacturing plants have only started collecting information about their machines as inputted in their CMMS which has an estimated successful implementation ratio of only 5-10%. Past failures have not been documented with the details needed to perform an accurate RFCA/FMEA/FRACAS resulting in ineffective PM and PdM tasks generated by the either the Classical or the several Modified RCM program.

The additional problem with FMEA/RFCA/FRACAS is that failures that hadn't happened yet can not be considered and therefore tasks to avoid those failures or diminish their impact can not be generated using this method. Another problem they have is that a past FMEA doesn't guarantee that the failure may repeat itself any time soon or showing the same characteristics as technologies and maintenance methodologies change over time. ie. If a bearing failed in the past because they lubricated it too often and now is being automatically lubricated making the FMEA based task obsolete and redundant and useless.

The combined integration of RCM and CMMS within a TPM structure is extremely time consuming, complex as the softwares may not necesarily communicate with each other resulting in only very few plants implementing these combined solution in a questionable manner.

In spite of its name, Reliability Centered Maintenance does not use any reliability functions but only mentions failure modes as they are represented by the bathtub curve (instant, random and aging related). RCM does not set up testing frequency using any mathematically based-reliability tools but only saying that the testing should happen at interval close enough to catch the failure on time. It doesn't provide tools for specific training on site machines, and doesn't include statistics nor integrates trends from PdM technologies.

RCM doesn't provide a process that addresses all maintenance losses in a effective, efficient, synergistic and holistic manner.

TPM

Another model-based maintenance improvement methodology such as TPM empowers employees through teams and involves them in different types of maintenance activities using metrics such as Overall Equipment Effectiveness (OEE) for feedback. TPM tends not to include the PdM technologies, uses very little statistic or reliability functions so critical to determine machine wear state. Its success depends on the experience and stability of the workforce. There is no readily available software for this methodology that is very popular in the automotive industry.

Lean Manufacturing/Lean Maintenance

Is another methodology used to eliminate waste or losses within any type of enterprise using several tools such as Kaizen, Kanban, 5S and teaming, visual management techniques among others taken from a variety of sources such as Total Quality Management (TQM), RCM, 6Sigma, etc. This methodology combined with PdM technologies is now being adapted to maintenance by some consultant companies in an effort to eliminate waste in the maintenance and production department. The solutions currently available provides a broader viewpoint in eliminating breakdowns but do so in a very fragmented manner with no tools to bring them together as a whole in a meaningful manner. Needless to say that adding up all of these partial solutions becomes troublesome, confusing, time consuming and extremely costly.

CMMS

Other software suppliers have also provided their own solution to some of the problems previously exposed. Computerized Maintenance Management Systems (CMMS) have been used in the industry for several years to improve the maintenance departments. They do provide solutions to several of the problems such as work order management, ordering, management of maintenance parts and stock available, monitoring stock turns, reordering levels, etc. Few CMMS software offer limited but cumbersome use of PdM technologies as part of their package. While this software has significantly helped in certain areas, it tends to provide only partial information when prompted to research information using queries. At times this information obtained is incomplete or imprecise and therefore rendered useless after few attempts.

Some other software providers offer training tools to document schematics and ladder diagrams used in industrial computers called Programmable Logic Controllers (PLC). While this software can be a great training tool, it provides a very partial solution.

Every Original Equipment Manufacturer (OEM) offers some improvement tool said to increase the reliability of systems and components by providing reliability packages to reduce breakdowns. This is done during the initial purchase or as a new and improved component or system that can be added to the existing machine, providing another of several partial solutions to eliminate all maintenance losses.

Planning and Scheduling (P&S): refers to those activities compiled to ensure that the R&R work is performed as effective and efficiently as possible. P&S activities includes but are not restricted to: kitting parts, obtaining special tools, hardware, SOP, etc., coordinating machine shutdowns with production, coordinating the correct skill levels needed, executing the R&R within SOP guidelines and estimates, documenting the results and performing the required follow-ups. This type of activities varies from plant to plant but generically speaking, their intention is to eliminate maintenance losses through P&S.

Some manufacturing plants have publicized their approach to maintenance with combinations of different technologies integrated with some of the methodologies mentioned above but they tend to be complex, very specific to their industry and culture, therefore hard to apply at other sites.

Some other companies have tried integrating them together but still done on a very fragmented, clutter and redundant manner therefore eluding the true benefits that a holistic and synergistic approach provides.

Training is also available from many vendors, suppliers and OEM. This training again, is very focused on one particular topic and it is not plant or machinery specific. Training tools for understanding the wear process as affected by their operating environment is not readily available.

The solutions presented by the above methodologies and software packages have shown to reduce few of the maintenance losses and in a partial manner and they had and still have significant problems in eliminating all of the sources of maintenance losses in a effective, efficient, synergistic and holistic manner.

In addition to the disadvantages of previous processes, methodologies and software packages, none of the previous processes provides solutions to the following problems:

- Integrating and optimizing methodologies for developing work orders
- Developing a scientific way to set testing frequencies for work orders
- Providing maintenance financial and work order metrics as feedback for users to trend and manage sources of maintenance losses
- Providing tools for managing R&R and Repair and Replacing Projects (R&RP) before, during and after their implementation
- Providing a process for integrating measuring technologies, alarms and spare parts
- Compiling and displaying critical maintenance information into a single source
- Providing information to involve users such as executives, senior managers and plant managers in critical maintenance processes.
- Providing tools for improving documentation, information sharing and developing training tools using in house expertise Accordingly, there exists a need to eliminate sources of maintenance losses using a holistic and synergistic process and software in such a manner that considers the above mentioned disadvantages not previously considered by any process, method or software packages.

BRIEF SUMMARY OF THE INVENTION

It is, therefore, an object of the present invention to provide an integrated and synergistic processes and software for eliminating sources of maintenance losses by creating work orders and providing tools for managing maintenance processes.

These processes for creating work orders can include integrating and using FMEA, non-FMEA and OEM work orders. The processes further include providing maintenance financial and work order metrics; processes for managing repair and replacing (R&R) and R&R Project (R&RP) processes; processes for integrating measuring technologies, alarms and spare parts and processes for involving users such as executives, senior managers and plant managers in maintenance processes.

One aspect of the present invention can relate to a computer-implemented process for eliminating sources of maintenance losses. These processes can include one or more computers for providing, displaying and sharing maintenance management tools.

The computer can include instructions for eliminating sources of maintenance losses according to a systematic process for creating and optimizing non-FMEA work order; calculating, trending work order metrics; integrating MT alarms, adjusting alarms for managing spare parts; entering, displaying, sharing, communicating and trending maintenance management information at several stages of R&R or R&RP implementation Still further objects and advantages of my invention will become apparent from a consideration of the drawings and ensuing description.

BRIEF DESCRIPTION OF THE SEVERAL VIEWS OF THE DRAWINGS

FIG. 4 shows a Work Order/Report Layout
FIG. 7 shows an example of a Software Screen for Data Entry
FIG. 9 shows an example of a Software Screen Showing Calculations

DETAILED DESCRIPTION OF THE INVENTION

Setting and Classifying Maintenance Financial Metrics

Maintenance processes need financial metrics for executives to understand the origins of maintenance losses and for setting manufacturing strategies and objectives. In order to be meaningful, these metrics must consider losses that might occur if assets breakdown. A feedback must be provided to compare calculated vs. measured losses as realized at the floor level.

In addition, setting maintenance financial metrics and parameters allows users such as executives, senior executives and plant managers to be directly involved in several maintenance processes such as ranking assets to optimize work orders, as well as setting alarm parameters and managing spare parts without needing a fully understanding of the maintenance function. With their involvement in maintenance improvement processes, executives gain a better understanding on how to better support these activities to increase profits.

Figure 1:
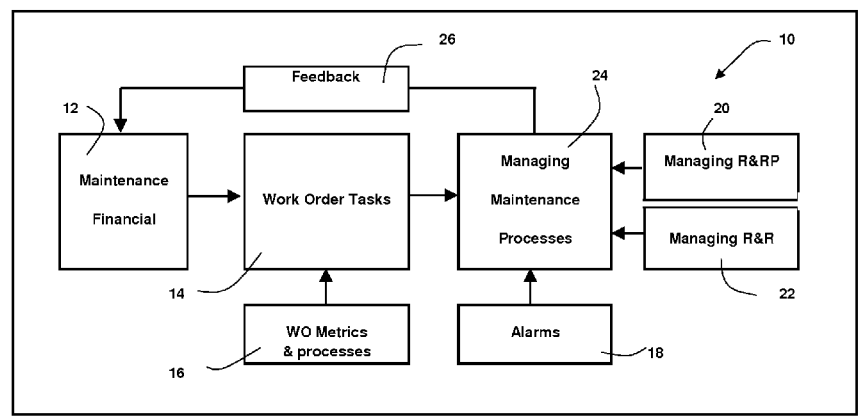
FIG. 1 shows a Process for Eliminating Maintenance Losses Flow Diagram

FIG. 1 illustrates flowchart 10 of a process for eliminating sources of maintenance losses in accordance to the described embodiment.

FIG. 1, block 12 relates to classifying, developing, ranking, measuring and calculating financial metrics for users to understand losses and to participate in critical decisions. Within this block, the following metrics are classified, developed, ranked, measured and calculated:

Classifying maintenance losses as those expenses directly resulting from repair and replacement (R&R) activities, those expenses resulting from activities that are related to R&R and those expenses that are consequences of R&R activities.

Activities related to R&R include logistics, troubleshooting, R&R actions, testing and start up activities that develop after or as result from an asset breaking down or from shutting down and asset for R&R project (R&RP) work.

The consequences of R&R activities are a plurality of expenses such as lack of R&R training, missed opportunities for knowledge acquisition, poor R&R documentation and communications, low morale and lack of team work, etc.

Classifying maintenance profits as those profits resulting from reducing, mitigating, avoiding and eliminating maintenance losses through a plurality of activities such as planning and scheduling R&R related activities, implementing R&R projects, properly managing R&R activities, generating and optimizing work orders, trending work order and financial parameters, improving documentation and communications, implementing training and knowledge acquiring processes, etc.

Classifying the Probability of Maintenance Profit and Losses (MP&L)

Every manufacturing plant in every type of industry, measures their profit and losses differently, sometimes following their own corporate-set methods, some other times following the changing directions of whoever is managing the plant at the time. There are no accepted standards across the industries for measuring losses and profits, in particular when it comes to maintenance profit and losses. A standard method for measuring maintenance profits and losses is not currently available and is needed to determine whether all plants within a corporation (or even with different industries) are performing according to established strategic, financial managerial and executive objectives.

Calculating the value of maintenance profits and losses (MP&L) allows for estimating the return on investment (ROI) of any R&R or R&RP and as result, eliminates the confusion created when project's future savings are overly exaggerated. Knowing the MP&L can be used to determine the profitability capability of the maintenance department. The following variables are used to describe maintenance profits and losses:

Classifying and Calculating the Probability of Hard Maintenance Profits and Losses (HMP&L):

The probability of HMP&L is the probability of maintenance profits and losses that are tangible and can be calculated, measured and accounted for.

It is critical to know the value of hard maintenance profits and losses so that any investment intended for eliminating losses or increasing profits can be accurately assessed and a valid ROI calculated.

Some examples of hard maintenance losses directly due to R&R, its related activities and consequences are:

Losses due to the cost of replacement asset parts and components.
Losses due to the repair and replacement activities
Productivity losses
QC losses/Rework created, harder/costlier start up, higher managerial/labor losses due to maintenance activities
Other internal losses based on industry uniqueness, etc.
Higher inventory taxes/higher transportation costs
Hard Profits are generated by reducing, mitigating, avoiding and eliminating hard maintenance losses.

Classifying and Calculating the Probability of Soft Maintenance Profit and Losses (SMP&L)

The probability of SMP&L is the probability of maintenance profits and losses that are intangible and can not be easily calculated, measured and accounted for.

While the value of HMP&L is typically measured in today's manufacturing plants, the value of SMP&L is left as secondary value, very seldom calculated and sometimes not even considered. When calculated, it typically gets exaggerated the most resulting in raised expectations that will never be met, leaving a bad taste for future maintenance improvement processes. It is critical to know that executives have accepted the method and the value for soft maintenance profits and losses so that any investment in eliminating maintenance losses can be accurately assessed.

As soft maintenance losses may not be easily calculated because of their complexity, a quantity could be assigned to those variables. For example, while it is difficult to calculate the probability of profits due to the elimination of contaminant ingression on hydraulic assets, the number of actions performed to improve cleanliness (work orders such as placing covers over hydraulic tanks, containing dust with filters, etc.) can be measured. Then as breakdowns due to dirt ingression are not occurring afterwards, one can intelligently assume that they were removed as result of those R&R activities avoiding the losses calculated from historical data. Another way to measure SMP&L is by assigning a number indicative of severity to each asset. The larger the number, the higher the SMP&L assigned to the asset's MP&L. A scale from 0 to 10 or selecting either 1, 2, or 3 levels to assign a value of soft maintenance losses that is meaningful yet simple to understand.

Some examples of soft losses due to R&R activities are:
inadequate customer service that lowers customer confidence which produces loss of client retention, new orders, existing orders and referrals for new business or internal services resulting from asset's breakdown
low employee retention, job security, satisfaction, morale (i.e. profit sharing plans)
lack of training time for cross training and advanced maintenance training
lack of executive and managerial cooperation/support/confidence in maintenance department leadership
decreased teamwork between maintenance and production
lowered working conditions
Soft profits are generated by reducing, mitigating, avoiding and eliminating soft losses.

Calculating the Probability of Total (Soft and Hard) Maintenance Profit and Losses (TMP&L)

In order to gain the commitment and the long term support from executives, senior and plant managers, the value of total probability of soft and hard maintenance profits and losses is provided to calculate and verify the total ROI of R&R related processes. TMP&L=HMP&L+SMP&L.

Ranking Assets Using TMP&L

Once TMP&L is calculated, then all assets are prioritized according to the highest financial profit and loss impact based on the TMP&L matrix Ranking and grouping maintenance assets according to their TMP&L, eliminates human subjective measuring and categorizing and ensures that asset prioritization is based on a company wide accepted maintenance financial system approved by users such as executives.

Calculating Line or Area (LMP&L) as the combined TMP&L for all assets belonging to a manufacturing/processing line or area. LMP&L is to be used for calculating the profits and losses from assets which cause an entire line or area to stop or slow down. It is also considered when requesting shutting a line or area for R&R activities.

Measuring AMP&L (Actual MP&L)

Once an R&R activity occurs, the actual profit and losses may vary from the probability of maintenance profit and losses affected by situational variables.

The TMP&L that accumulates while performing R&R related activities resulting from break downs or R&R project work is the AMP&L. AMP&L is an actual measured number and not a probability.

Classifying and calculating Variant VMP&L is the MP&L which is the Total MP&L minus the Actual MP&L (AMP&L) that occurred during or as result of R&R activities or R&RP. It shows the difference resulting from the calculated probability value and the actual value of the maintenance profit and losses. This metric provides a value that can be used to assess the calculation accuracy of the TMP&L and to evaluate the circumstances which originated the variation. VMP&L=TMP&L−AMP&L.

Classifying and Calculating Universal MP&L (UMP&L)

In a non redundant system (systems with no back up) and regardless of the type of maintenance, whether, reactive, PM or WCM, assets that break down are repaired or replaced to be fully operational again.

When similar industrial assets are operated within alike industries or environments, the time that it takes to be replaced and repaired and the resulting expense is considered fixed (because of its insignificant economical variability) For example, repairing or replacing a failed bearing on a compressor brand Z located in plant A should take approximately the same amount of time as to repairing or replacing a similar bearing on a compressor brand Z located in plant B, as long as operating conditions are similar.

If implementing a multiplicity of processes for avoiding, eliminating, reducing and mitigating maintenance losses such as training, planning and scheduling, managing R&R, etc., all of the repairing and replacing activities (logistic, troubleshooting, R&R actions, testing and starting up) could be eventually eliminated, reduced and mitigated to only allow the lowest possible losses. For example, this can be done by implementing the following loss eliminating processes:

Losses originated from R&R activities such as logistics can be eliminated with planning and scheduling manpower, parts, tools and coordinating all related work.

Losses originated from R&R activities such as troubleshooting can be minimized through training and testing assets to exactly determine which component or system is wearing down. Once the asset component that is wearing down is determined, it can be repaired or replaced without having to troubleshoot the entire system as done when a breakdown occurs.

Losses originated from R&R actions can be minimized to asset or industry specific lowest possible times through training, acquiring knowledge, experience and improving management.

Losses originated from R&R activities such as testing and start up can be minimized to asset and industry-specific lowest possible times through training, management, improving communications and gaining experience.

Universal Maintenance Profit and Losses is defined as the MP&L resulting when each and all of the losses due to R&R activities for an asset are eliminated or minimized to their asset and industry lowest possible levels. The UMP&L represents a possible value to set as a strategic objective for eliminating and minimizing all sources of losses due to R&R activities providing in this manner an attainable strategic level goal being set at the executive office and can be reached at the floor level. If all plants within the same industry reach very similar UMP&L levels, then it can be said that they have reached a universal level in which they can not eliminate or minimize any additional maintenance losses and as result, it can be said that they have maximized maintenance profits and minimized maintenance losses. The minimized UMP&L value is considered as the cost of doing business and not necessarily a loss but a realistic strategic objective to go after. It is not realistic or obtainable to eliminate all maintenance losses. It is realistic to implement processes for eliminating sources of maintenance losses up until the UMP&L level is reached.

The TUMP&L (Total UMP&L) is the UMP&L when all assets' UMP&L is added up.

The UMP&L can be calculated for an entire line or an area and labeled as Line/Area UMP&L.

Classifying and calculating Max MP&L is The difference between TMP&L and TUMP&L represents a maximum profit that could be obtained when all processes for eliminating the sources of maintenance losses such as training, developing work orders, management, troubleshooting, etc., are implemented. Max MP&L=TMP&L−TUMP&L.

Classifying and calculating Differential DMP&L is the differential MP&L which is the Actual MP&L (AMP&L) minus the Universal UMP&L and indicates how much profits are still available to obtain. DMP&L=Actual AMP&L−UMP&L Developing and Optimizing Work Order Tasks FIG. 1, block 14 relates to developing and optimizing work order tasks using ranking assets table developed in block 12. Work orders tasks have been traditionally developed using methods based on past failure data such as Failure Mode and Effect Analysis (FMEA), Root Failure Cause Analysis (RFCA) or Failure-Reporting Analysis and Corrective Action System (FRACAS). RCM is the most widely known method for developing work orders using a failure based method of FMEA and accompanying questions. The problem with these processes is that past or historical failure data is not always available and when available, the root of the failure may not be completely known nor understood as very seldom a root failure cause analysis of the failed component is accomplished. Without a detailed FMEA of the failed component, the true cause of the failure will not be known.

For example, a work order may be created to lubricate a bearing more often than before because past historical data said that it failed because it wasn't lubricated. If the bearing had been taken apart to see what created the failure, a proper work order task could have been developed to eliminate the true source of failure. It is not possible to know if the bearing failed because it wasn't properly aligned. It is not possible to know if the bearing failed because it was either over or under lubricated. It is impossible to know if contamination from the manufacturing process created the failure. If a root failure cause analysis would have been performed on the bearing, it could have led to three different tasks to address the real source of the failure.

Another problem developing failure based (FB) tasks is that they often require assembling a team of experts to discuss historical data that was not previously recorded and to confirm the quality of the work orders resulting from this exercise. Needless to say that this adds another significant expense as gathering maintenance experts is very valuable and puts a strain on the maintenance department already short of experienced personnel.

Developing Work Order Tasks Using Non-FMEA Method

A non-FMEA process for developing work orders tasks is one which is not based on past or historical failure data. Thus, providing a method for developing work order tasks targeted to eliminate widely known sources of failures such as component's wear and stress sources, contaminants ingression, human errors, etc. without having to depend on questionable historical data.

A non-FMEA method for creating tasks is based on measuring wear and stress levels using measurement technologies (MT) and applying 5S4M and 5S4P which originated from the 5S processes. Non-FMEA method doesn't require the knowledge of past or possible failure modes and doesn't necessarily require the participation of those with experience in past failure modes such as maintenance technicians and operators. If previous failure based work orders have been properly documented and effectively addressed, they may be incorporated provided that they are not covered already by a newly created non-FMEA work order. As result, the non-FMEA method provides a very effective and efficient way to develop work order tasks for managers and engineers with little or no experience in failure mode analysis or hands on experience troubleshooting assets.

Developing Work Orders Using MT Including Optronics.

Measuring technologies are used in the industry to determine asset wear and stress levels. The data obtained from these technologies can be trended over time and when a certain value or threshold is exceeded, an alarm is tripped indicating a change in assets' condition. As result, R&RP are implemented for avoiding, eliminating, mitigating and reducing a breakdown.

Optronics is classified as a MT used to measures and trend asset's wear, stress and performance parameters using multiple technologies other than the traditional ones (vibration analysis, ultrasonic analysis, infrared analysis and oil analysis). Analog or microprocessor based measuring technologies such mechanical gauges, Supervisory Control and Data Acquisition (SCADA), Man Machine Interface (MMI), programmable logic controllers (PLC), electronic drives, networking and interfacing of sensors and instrumentation technology provide information that can be used to determine asset's wear, stress and performance levels. These types of work orders are generated with out considering their past failure history. MTs are applied to the type of asset or component which wears or stress levels are intended to detect according to the following table. For example, MT oil analysis applies to hydraulic systems, gearboxes and pumps among others. Once the asset type is identified as such, then an oil analysis work order is generated for that asset type or component.

| Measuring Technologies | R & R Work Order (WO) Tasks |
| --- | --- |
| Oil | WO to change fluids or units (hydraulics, gearboxes, pumps, etc.) |
| Vibration | WO to determine bearings, misalignments and unbalance conditions, etc. |
| Ultrasonic | WO to determine bearings, lubrication condition, air leaks, etc. |
| Infrared | WO to determine temperature levels in electrical distribution and machinery (friction) |
| Power | WO to determine and trend electrical changes on machines |
| Temperature | WO to determine temperature points on machinery |
| Optronics | WO to visually inspect and electronically record wear or stress issues |

Developing Work Orders Using 5S4M Process

The original 5S process consists of five components: Shinning, Simplifying, Sorting, Standardizing and Sustaining. These five components are organized or prioritized in no particular order.

The 5S4M (5S for machines or 5S for maintenance) process is used to develop work orders to address maintenance or machine needs. In the 5S4M process, the "Sustaining" component of the original 5S process is replaced by a mathematical means to provide trends and managerial tools using Statistics, Forecasting and Reliability Functions (SFRF).

The modified 5S process (5S4M) then consists of the following five components: Shinning, Simplifying, Sorting, Standardizing and SFRF and they are applied exclusively to machine or maintenance processes.

Creating Work Orders for Each 5S4M as Follows:

Shinning

Using 5S4M Shinning component for creating work orders to make the asset as good as new or better.

An example of shinning work order is one for implementing improvement activities such as cleaning asset internal component's surfaces for reducing their temperature and reducing risk of an electrical short or contamination.

Another example is to modify an asset surface for allowing a better surface-sensor contact for using measuring technologies.

Creating work orders and building SOP for Shinning work orders by developing a method for prompting questions such as why, what and how to Shine an asset.

Simplifying

Using 5S4M Simplifying component for creating work orders, making the asset easier to test, repair and replace and safer to do maintenance work on them.

An example of Simplifying work order is to install infrared windows for performing safer infrared inspection of high voltage gear without having to remove all electrical panels or to install mounts for setting vibration or ultrasonic sensors to simplify the data collection process. Another example is to make asset modifications to facilitate the implementation of operator's work orders.

Creating work orders and building SOP for Simplifying work orders by developing a method for prompting questions such as why, what and how to Simplify an asset.

Sorting

Using 5S4M Sorting component for creating work orders to make it easier to locate and access asset spare parts, replacement components and consumable items, OEM maintenance manuals, blueprints, ladder diagrams and other asset's related material.

An example of Sorting work order is to develop visual management tools for a safer and cleaner machine shop and repair area. Another example is to organize often-used components in a manner that it makes it easier to remove them through identification tags or to paint the shape of tools to locate the right maintenance tool in the right place (known as shadow box). May include implementing or improving a CMMS software for managing spare parts inventory and utilizing other CMMS functionalities for sorting maintenance processes.

Creating work orders and building SOP for Sorting work orders by developing a method for prompting questions such as why, what and how to Sort an asset.

Standardizing

Using 5S4M Standardizing component for creating work orders to provide and make accessible maintenance standards, standard operating procedures (SOP's), maintenance procedures and information using different methods.

An example of Standardizing work order is to implement a software for standardizing maintenance activities, management, communication forms, etc. or improve existing CMMS software for managing spare parts inventory, PM schedule, procurement, etc.

Another example is standardizing maintenance information (communications boards, training manuals, goals and objectives, etc.) using visual management aids like communication boards, LED displays, etc. to document and establish standards for maintenance processes.

Creating work orders and building SOP for Standardizing work orders by developing a method for prompting questions such as why, what and how to Standardize assets and maintenance related information.

Statistic, Forecasting and Reliability Functions (SFRF)

Using 5S4M Statistic, Forecasting and Reliability Functions component for creating work orders for facilitating trending and evaluating asset's data such as maintenance, performance and reliability information.

An example of SFRF work order is for trending data obtained from measuring technologies, maintenance work orders completed on time, using forecasting and reliability functions to closely trend and estimate the confidence interval of asset failure likelihood, determining testing frequency, determining statistically when a part has to be replaced (based on mean time between or before failures), forecasting asset performance and life expectancy under different loads and conditions. Another example of SFR&F work orders is to install gauges, meters and sensors to measure variables and determining which parameters are truly meaningful and worth analyzing. Creating work orders and building SOP for Statistic, Forecasting and Reliability Functions work orders by developing a method for prompting questions such as why, what and how to trend asset's wear and stress variables using Statistics, Forecasting and Reliability Functions.

Developing Work Orders Using 5S4P Process

The original 5S process consists of five components: Shinning, Simplifying, Sorting, Standardizing and Sustaining, organized in no particular order.

The 5S4P (5S for production or 5S for process) process is used for developing work orders to address production or manufacturing process needs. In the 5S4P process, the Sustaining component of the original 5S process is replaced by a mathematical means to provide trends and managerial tools using SFRF and they are applied exclusively to production or manufacturing processes.

The modified 5S process (5S4P) then consists of the following five components: Shinning, Simplifying, Sorting, Standardizing and SFRF.

Creating Work Orders for Each 5S4P as follows:

Shinning

Using 5S4P Shinning component for creating work orders to make the asset area or location easier to clean, and safer by keeping contaminants from entering the asset's internal components such as bearing or hydraulic valves and keeping assets surface and floor clean from contaminants. An example of shinning work order is one for implementing improvement activities such as painting a floor, resurfacing an area, making a cover easy to remove, etc. Creating work orders and building SOP for Shinning work orders by developing a method for prompting questions such as why, what and how to Shine an asset.

Simplifying

Using 5S4P Simplifying component for creating work orders, making an area and asset easier to test, clean and to operate.

An example of Simplifying work order is to improve a cell layout to reduce the amount of operator's movements, reduce the reach and eliminate wasteful activities.

Creating work orders and building SOP for Simplifying work orders by developing a method for prompting questions such as why, what and how to Simplify an area, an asset's external components or a manufacturing process.

Sorting: Using 5S4P Sorting component for creating work orders to make it easier to locate and access area, process and asset's consumable parts, OEM operating manuals and other related material, etc.

Remove necessary from unnecessary items. May include implementing or improving a CMMS software for managing production and spare parts inventory and utilizing other CMMS functionalities for sorting production processes.

An example of Sorting work order is to develop visual management tools for a safer and cleaner machine and asset's area, organize often used components in a manner that it is easier and better to store and find them. Another example is to paint a shape of production tools to locate the right tool on the right place.

Creating work orders and building SOP for Sorting work orders by developing a method for prompting questions such as why, what and how to Sort an area, an asset or a manufacturing process.

Standardizing: Using 5S4P Standardizing component for creating work orders to provide and make accessible production standards, SOP's, procedures and information using different means. An example of Standardizing work order is one for using a CMMS software for managing production consumable parts inventory, operator's PM schedule, etc.

Another example is standardizing production/operations information (communications boards, training manuals, goals and objectives, etc.) using visual management aids like communication boards, LED displays, etc. to document and establish standards for all production/operation processes and building and incorporating Lean Manufacturing and TQM tools.

Creating work orders and building SOP for Standardizing work orders by developing a method for prompting questions such as why, what and how to Standardize an area, an asset or a production/operation related information.

Statistic, Forecasting and Reliability Functions (SFRF)

Using 5S4P Statistic (or Statistic Process Control), Forecasting and Reliability Functions component for creating work orders for facilitating trending asset's production, performance and quality information.

An example of SFRF work order is for trending data obtained by production operators, operator's work orders completed on time, using reliability functions to closely trend and estimate when an asset will likely fail, determining statistically when a production consumable part has to be replaced based on mean time between or before failures, forecasting process performance under different material, loads and conditions. Another example of SFRF is use gauges, meters and sensors to measure manufacturing process variables and determining which parameters are truly meaningful and worth analyzing.

Creating work orders and building SOP for SFRF work orders by developing a method for prompting questions such as why, what and how to trend process variables using Statistic, Forecasting and Reliability Functions.

Creating 5S4M, 5S4P & MT Enabling Work Orders

Creating work order tasks for permitting the implementation of 5S4M, 5S4P and MT such as: modifying assets by improving their safety; simplifying asset maintenance; facilitating the data collection of wear, performance and stress variables; permitting the implementation of the 5S4M and 5S4P based work orders to include documenting SOP; detailing items and procedures for each task created. Creating work order tasks for improving assets by modifying assets for allowing/easing/facilitating/making safer each and every 5S4P and 5S4M components to include documenting SOP, detailing items and procedures for each task.

The SOP's are developed to detail the task that was created using 5S4M, 5S4P and MT. For example, once the work order 5S4M for shinning has been created, the SOP is developed by asking questions such as what needs to be cleaned up. How is the asset going to be cleaned up? Are there any additional improvements needed for the asset to be cleaned up in an easier and safer manner? Can a trained operator do the task? What are the requirements to do this task? Answering all of these questions can take some time, the option to complete the SOP at a later time is provided. Similar questions are prompted for the rest of the 5S4M as well as the 5S4P. For the MT work orders, the questions vary slightly. For example, for oil analysis work order the SOP is developed by asking questions such as how to pull an oil sample properly? Are there any additional improvements that need to be made for the asset to be sampled in a safer and easier manner?

Incorporating FMEA, OEM and Regulatory Compliance Work Orders

Adding the failure based methodology of RFCA or FMEA or FRACAS from known and trusted past failure history to create work order tasks can be very valuable. Failure based (FB) work orders are designed to avoid the same failure modes that occurred in the past by eliminating the source that created them. An example of this type of work orders would be to lubricate a bearing which failed in the past because there is enough documentation to prove that it was not included in the lubrication route and therefore never lubricated.

Adding original equipment manufacturer (OEM) recommended work order tasks and SOP's to create work order tasks. This type of work orders typically includes maintenance tasks to be performed at established intervals and is typical of specific assets as result may not apply to other assets. These tasks may be mandatory in case of warranty issues.

These tasks need to be incorporated to the process for creating work order tasks after investigating the validity of FMEA/RFCA and OEM work orders and when not covered, modified or conflictive with non FMEA tasks (MT, 5S4M and 5S4P).

Using regulatory compliance required activities for creating work order tasks for those industries that are ordered to perform certain work to be compliant with a regulatory agency. These tasks need to be incorporated to the process for creating work order tasks after confirming that they have not been addressed by previous FMEA and non-FMEA type of work orders.

Prioritizing and Optimizing Work Orders

The prioritizing and optimizing process is implemented to avoid developing the same number and type of non-FMEA work orders for all assets without considering their return on investment. Writing work orders for all assets containing all types of work orders regardless of the TMP&L value of the asset would be counterproductive and very expensive. Adding work order tasks using non FMEA methods could easily add up to lots of unnecessary work. Prioritizing work order tasks allows for only developing those work orders which will provide the best ROI according to the assets ranking position and taking care of the most critical assets first.

Setting Priority and Number of 5S4M Work Orders

5S4M work order tasks are prioritized using a ranked list of assets which was previously developed at block 12, FIG. 1. The number of 5S4M work orders per assets is also established using the ranked list of assets. The most financially critical assets are the ones with the highest TMP&L values. The least financially critical assets are the ones with the lowest TMP&L values and medium critical assets are the ones which fall in between. Each of the 5S4M components is prioritized and executed according to the asset's condition, according to assets most immediate needs and according to (internal or external) customer's and/or industry needs.

The number of prioritized 5S4M work orders per asset criticality can be determined by users such as executives, senior managers or plant managers giving them another maintenance tool they can use to be directly involved in a critical maintenance decisions. Users can select how many 5S4M and which ones will be implemented according to asset's TMP&L criticality list.

For example, if customer needs a fast ROI, the 5S4M Shinning could provide a better ROI than the 5S4M Standardizing which is time consuming and has a long term payback. 5S4M Statistics, Forecasting and Reliability Functions (SF&RF) could be second because of the importance of trending critical asset parameters. As result, the 5S4M shinning should be implemented first, second SRRF and so forth. In certain industries, like the food processing, 5S4M shinning may not be the first one because these types of manufacturing plants are already mandated to be extremely cleaned.

In the following table, when setting the number of 5S4M to use per assets, all 5S4M work orders are implemented for the most critical assets, fewer for medium critical while only a most critical Shinning 5S4M is implemented for the least critical assets.

| TMP & L Asset Criticality | 1st - Shinning | 2nd SF RF | 3rd Simplifying | $4^{th}$ Sorting | $5^{th}$ Standardizing | Total 5S4M Prioritized per asset |
|---|---|---|---|---|---|---|
| Most Critical Asset | 1 | 1 | 1 | 1 | 1 | 5 |
| Medium Critical | 1 | 1 | 1 | 0 | 0 | 3 |
| Least Critical Asset | 1 | 0 | 0 | 0 | 0 | 1 |

Setting Priority and Number of 5S4P Work Orders

Using a list of prioritized assets ranked according to their financial criticality (using TMP&L) and setting priority and number of 5S4P work orders per asset. The most financially critical assets are the ones with the highest TMP&L values. The least financially critical assets are the ones with the lowest TMP&L values and medium critical assets are the ones which fall in between.

Each of the 5S4P is prioritized and executed according to the asset's or area most immediate needs and according to (internal or external) customer's and/or industry needs. The number of prioritized 5S4M work orders per asset criticality can be determined by executives, senior managers or plant managers giving them a maintenance tool they can use to get directly involved. They can select how many 5S4P and which ones will be implemented according to asset's TMP&L criticality ranking list. For example, if customer needs a fast ROI, the 5S4P Shinning could provide a fastest ROI than a 5S4P Standardizing 5S4P Sorting could be second as it is very important to have operators' tools and area sorted to improve operator's effectiveness and efficiencies. As result, the 5S4P Shinning would be implemented first, Sorting second leaving Standardizing for last and Simplifying and SFRF to be selected.

In the following table, when setting the number of 5S4P to use per assets, all 5S4P work orders are implemented for the most critical assets, fewer for medium critical while only a most critical 5S4P Shinning is implemented for the least critical assets.

| TMP & L Asset/Area Criticality | 1st - Shinning | 2nd Sorting | 3rd SF & RF | $4^{th}$ Simplifying | $5^{th}$ Standardizing | Total 5S4P |
|---|---|---|---|---|---|---|
| Most Critical Area/Asset | 1 | 1 | 1 | 1 | 1 | 5 |
| Medium Critical Area/Asset | 1 | 1 | 1 | 0 | 0 | 3 |

-continued

| TMP & L Asset/Area Criticality | 1st - Shinning | 2nd Sorting | 3rd SF & RF | 4th Simplifying | 5th Standardizing | Total 5S4P |
|---|---|---|---|---|---|---|
| Least Critical Area/Asset | 1 | 0 | 0 | 0 | 0 | 1 |

Setting Number of MT Work Order Tasks

A ranked list of prioritized assets according to their TMP&L is used to set the number of MT work orders per asset. The most financially critical assets are the ones with the highest TMP&L values. The least financially critical assets are the ones with the lowest TMP&L values and medium critical assets are the ones which fall in between.

A table is used to set all available MT's according to asset's criticality. The assignment of each MT to be used per asset type is to be done after the number of MT is set first. As the number of MT's available varies from plant to plant and their application varies from asset to asset, a generic number "n" is used to indicate the total number of technologies available at a plant. In this example n equals four indicating that only four MT's are available for this plant.

In the following table, when setting the number of MT's to use per assets, all four MT's are implemented for the most critical assets, three MT's are implemented for medium critical while only one MT is implemented for the least critical assets.

| Asset Criticality | MT 1 | MT 2 | ...MT n-1 | MT n | Total |
|---|---|---|---|---|---|
| Most Critical asset | 1 | 1 | 1 | 1 | 4 |
| Medium Critical | 1 | 1 | 1 | 0 | 3 |
| Least Critical Asset | 1 | 0 | 0 | 0 | 1 |

Setting Priority of MT

Using a ranked list of prioritized assets according to their TMP&L to set the most effective and efficient MT per asset. The most financially critical assets are the ones with the highest TMP&L values. The least financially critical assets are the ones with the lowest TMP&L values and medium critical assets are the ones which fall in between.

Once the number of MT per asset criticality is known from the previous table, a table is used to select which of all available "n" MT's will be the most effective and efficient when applied to specific type of assets. Each asset is classified according to its type (motor, compressor, blower, pump, etc.) and each MT is prioritized according to how closely they track or follow the wear or stress process of a particular asset type versus time.

For example, from the previous table, a high critical gearbox would have all "n" MT technologies. As n is equal to 4 available MT's then, a first MT work order to develop would be oil analysis, a second MT to develop would be a vibration analysis work order, a third MT to develop would be an ultrasonic analysis work order, a fourth MT to use would be temperature measurement work order using infrared. Another example for a plant with n=4, a high critical motor would have all 4 MT technologies again. The first MT would be Motor and Current Analysis (MCA) work order, the second MT would be a vibration analysis work order, a third MT would be an ultrasonic work order, and the fourth MT would be infrared work order.

This process ensures that only the most relevant MT work orders are properly assigned, for example, as it is impossible to apply Motor Current Analysis (MCA) to a gearbox. Selecting the most relevant technologies results in improving efficiencies by eliminating the costs of creating and implementing a work order which won't describe closely the wear or stress pattern of an asset.

Once the proper technologies are selected to provide the most effective and efficient task, Statistical, Forecasting and Reliability Functions (SFRF) are selected to trend MT results. The proper SFRF are selected according to the asset's type and also considering where the asset is in its life cycle or aging process (newly installed, after initial failures have been eliminated, or near decommissioning of the asset). Assets that are not critical may not be given an SFRF to depict their trend as they may seem too time consuming and may provide a small ROI.

The following table shows how to select the most effective and efficient MT for best describing the wear or stress pattern according to the type of asset and using a ranked list.

The number of MT was previously dictated when setting the number of MT per asset.

| Prioritized Asset List | Asset Type | MT 1 (MCA) | MT 2 (vibration) | MT n-1 (ultrasonic) | MT n (oil) | RF for each MT |
|---|---|---|---|---|---|---|
| Most Critical asset | motor | 1 | 2 | 3 | Na | Weibull |
| ... | | | | | | |
| Least Critical Asset | gearbox | Na | 3 | 2 | 1 | none |

Setting Work Order Task Frequencies

Implementing MT to trend asset wear and stress levels doesn't guarantee that all failures or wear processes will be seen on time to avoid a failure. This occurs because assets may not be tested frequently enough to detect trends in a timely manner. When failure occurs, executives and managers lose confidence in the measuring technologies and maintenance personnel and as result, executives stop supporting MT's and other maintenance initiatives as they see them as a wasted effort with no or exaggerated ROI.

One way to know when an asset is wearing down or under stress is by testing them frequently enough to collect data and confirm a wear or stress trend before failure occurs.

The reason why these type of failures occurs is because currently, there is not a scientifically or mathematically based method to set testing frequencies, yet the confidence on the trended graphs resulting from measurement technologies is directly proportional to the number of data points collected. It is common sense that the more data points, the more accurate the prediction of the failure probability time interval. The problem carried with this approach is that more data points means higher testing costs and more repetitive unchallenging work order tasks. An effective and efficient method for setting testing frequencies in a timely manner is presented as follows:

To set work order task frequencies a mathematical method such as a Reliability Function (Weibull, lognormal, exponential, etc.) is assigned to each asset, after selecting the one that best fits asset's failure characteristic curve. The asset's running time within its life cycle (newly installed, normal wear or close to decommissioning) must be taken into consideration to select the proper reliability function.

A desired reliability and desired confidence is set according to the asset's TMP&L or can be set by users such as owners, executives, senior managers, plant managers or engineers, as desired or deemed appropriate. This provides yet another tool for management involvement in a maintenance process such as the task of developing and optimizing work order process.

In order to satisfy these two conditions (desired reliability and desired confidence) a confidence interval (intervals where failure is expected to occur within a certain probability) is calculated using known and readily available mathematics or reliability software. Once the confidence interval (typically spanning in days) is determined mathematically, the number of data points needed to achieve that desired reliability and desired confidence within that particular confidence interval is estimated using mathematical tools and readily available trending simulation and reliability modeling software. The number of data points obtained is then divided by twelve to calculate the work order task frequencies per month for each task As a result, a task which requires too frequent testing may be assigned to an operator who is closer to the asset to save logistic time from a maintenance technician.

This mathematically based table provides the user (including executives, senior manager and plant managers) with a applied reliability model to set testing frequencies needed in order to obtain the desired reliability within expected confidence. Using the table for setting work order task frequencies provides a scientifically based method to determine work order testing frequencies so assets can be tested frequently enough to accurately trend the wear and stress levels and schedule repairing and replacing activities before the asset's failure.

| Prioritized Asset List | Preferred Reliability Function | Desired Reliability | Desired Confidence | Confidence Intervals (days) | Data points Needed | Testing freq. per month |
|---|---|---|---|---|---|---|
| Most Critical Asset | Weibull | 99% | 90% | 14 | 72 | 6 |
| ... | | | | | | |
| Least Critical Asset | Weibull | 75% | 70% | 35 | 12 | 1 |

Calculating Work Order Profit and Losses

Calculating work order profit and losses provides a tool for determining when to perform a task and when not to perform tasks exclusively based on the economics of comparing the profits and losses of implementing a work order. This is a very critical issue as MT work orders tend to be expensive and time consuming, in particular when used for non critical assets.

Developing Maintenance Work Order Metrics and Processes

FIG. 1, block 16 relates to developing and calculating maintenance work order metrics for measuring, categorizing and classifying sources of maintenance losses and profits. Within this block, the following metrics are defined, developed, measured and calculated:

Separating R&R Activities Time Components (RRATC)

By dividing the R&R activities into their time components one can pinpoint where are the most significant R&R losses coming from.

Without separating the components of repair and replacing activities no one can determine whether the largest loss contributor was originated while searching for the spare part, or was due to a troubleshooting error or during the start up or somewhere else. Measuring and trending the time and impact of each R&R component provides a better understanding of the repair and replacing activities areas of weakness and what direct action can be taken to correct each of them, starting with the most significant to obtain the most immediate ROI.

Repair and replacing activities are divided into the following time components (RRATC) according to the functions being performed Logistic time is the time that takes to arrange, coordinate labor, replacement parts and tools needed to perform, coordinate and manage the repairing and replacing activities being considered. This may involve getting production operators, supervisors and managers involved. May be planned and scheduled or not.

Troubleshooting time is the time that takes to find the source of the breakdown. This may involve questioning the operator about the failure mode (how did the asset fail to perform or symptoms the operator may had noticed before the breakdown). May also require testing electrical, mechanical, hydraulic or other components using testing instruments, reviewing blueprints, SOP and OEM manuals.

Repairing & replacing action time is the time that takes to repair or replace a malfunctioning asset's system, subsystem or component. The type of repair and replacing activities depends on what was found during the troubleshooting period. It is the hands on time spent usually referred as "turning wrenches".

The R&R component of the RRATC can classify R&R actions according to the probability of damage severity resulting from asset break down as Minimum R&R (an example would be replacing only bearings in a motor)

Medium R&R (an example would be replacing bearings and shaft replacement in a motor)

Major R&R (an example would be replacing bearings and shaft replacement in a motor and additional work performed on frame, coils, etc.)

The R&R component of the RRATC can further classify R&R actions according to the consequences (probability) that break downs may have on physically connected assets (connected directly or indirectly to the asset which broke down). This classification is as follows:

Upstream equipment (example would be a motor burning up after a gearbox locked up)

Downstream equipment (contaminants or pieces from a broken pump carried into the system clogging up valves, scratching surfaces and damaging tight hydraulic component tolerances)

Internal component (ruined gears because of a bad bearing in a gearbox, circuit boards burning up as consequences of a deliberately bypassed fuse)

Testing time is the time that takes to test and to verify that the asset has been fixed and it is functional to maintenance and production satisfaction. Generally, if properly tested, it is released to production immediately.

Starting up times is the time that follows the testing after asset has been fixed and production operators are able to continue their normal operation starting the production process. Fully operational is when product passes quality control inspections.

The Repair and Replacing Activities Time Components (RRATC) are used for determining the cost of each work order and to include this calculation in the ROI for every task. The RRATC time components can be calculated from standards, historical, estimated or measured values based on plant layout, industrial standards and in house expertise or knowledge.

Classifying Work Order Tasks as per R&R, R&RP, M, I

Classifying work orders as Repairing and Replacing (R&R) work orders which are those work orders that are unplanned and unscheduled (commonly referred to as reactive or emergency maintenance) and R&R Project (R&RP) work orders which are those work orders that are those repair and replacing work orders that are planned and scheduled.

The R&R Project work orders are further classified in two subgroups: Measurement and Improvement. The Measurement (M) R&R Project work orders are those planned and scheduled work orders tasks intended in obtaining measurement from assets, including wear and stress, and process variables.

The Improvement (I) R&R Project work orders are those planned and scheduled work order tasks designed to improve an asset or process whether is the result of a 5S4M or 5S4P or MT task or an improvement project to facilitate R&R activities for an asset or manufacturing process. Work orders related to training, communicating and developing SOP or related maintenance material are considered an improvement work order task.

Trending work orders as R&R, R&R Project and using its further classification of M and I, allows users to see progress as R&R work orders should decrease while R&RP should increase resulting in higher maintenance profits.

Classifying Work Order Origin and Purpose Using the MPP Process and MPP Metric

The interaction between machines (assets), process (manufacturing) and people (maintenance and operations) create several issues that have not been properly addressed as a sources of maintenance losses.

One of the issues is asset's wear and tear. It is unknown how asset performance is affecting the process and therefore the final end product result. It is uncertain whether assets are wearing down under normal process conditions or not. It is unknown what are those normal process conditions and it is unknown which assets are being properly maintained by maintenance and operators. As a result it is impossible to asses where maintenance losses are truly originating from.

Another issue is the manufacturing process itself. It is uncertain if the process is too hard on the machines. It is uncertain if the machine load is affecting machine's reliability. It is uncertain which process parameters are properly set or set according to operator's changing desires or mood. As a result it is impossible to asses where maintenance losses are truly originating from.

Another issue is the interaction between different departments. It is not uncommon, to have production personnel blaming maintenance for not keeping the machines running and vice versa, it is not uncommon to have maintenance personnel blaming production for not giving them the machines for repairing and replacing activities before they break. It is uncertain to know if people (maintenance, operators and managers) are trained to run assets according thoroughly designed and approved SOP or they run machines according to however they feel on any particular day. As a result it is impossible to asses where maintenance losses are truly originating from.

It is very important to eliminate these uncertainties to find out where are these interaction losses coming from so resources can be allocated to eliminate them as they are immediately identified and known.

Classifying work order origin and purpose using the MPP metric allows executives and plant managers to track, trend and as result manage the three sources of interaction losses when this information is not readily available.

Trending these metric, as either Machine, Process or People, it will be clear to see where is the source of losses coming from and then a solution can be implemented by properly and promptly addressing the originating source one at a time, addressing first the most prominent.

This metric allows management to keep track on which is the source of major losses and therefore take immediate action where it is needed. If the main issue is People, then training, communications and teamwork may be addressed before looking at machine or process issues. If the main issue is Process, then, keeping the process within original specs may reduce those losses before embarking into solving machine or people issues. If the main issue is machines, then improving their maintenance work orders may reduce interaction losses before addressing people or process issues.

Classifying work order origin and purpose using the MPP process for understanding which ones are the sources of maintenance losses to ensure that executives and managers address them as they first develop.

The MPP process establishes that first all machine or maintenance (M) related issues must be eliminated, after machines are performing properly, the manufacturing Process or Production (P) must be adjusted accordingly to the new machine performance parameters and only then, after assets are performing and the process is producing the expected product, People (P) must be trained on the corrected and improved manufacturing process standards and performance. As all plants are different, the MPP process does not apply universally thus the order of "Machine-Process-People" may be different from plant to plant. There are several sequences to implement this process: Machine-People-Process, Process-Machine-People, Process-People-Machine, People-Machine-Process and People-Process-Machine.

To find out which sequence best represents a plant, it is necessary to classify each work order into the three MPP metrics: Machine (or maintenance), Process (or production) and People. Past work orders can be classified using this method.

Assigning each task according to the origin or the purpose (in particular for projects) to a work order provides a valuable metric for determining which one is the main contributors to the MP&L and how a process to eliminate those losses can be applied to address the main issues first, then the second and then the last one providing, in this manner, the best ROI.

Maintenance R&R work orders are assigned as such when an asset is wearing, stressing or breaking down or when Maintenance Project work orders are intended to eliminating, mitigating, avoiding, reducing a work order of maintenance origin.

Process R&R work orders are assigned as such when an asset wearing down or breaking down or efficiency and effectiveness losses due to the process itself. I.e., a pipe leaked due to corrosion from the fluid that it was intended to contained, or an asset broke due to product overload, etc.

People R&R work orders are assigned as such when either assets or process losses are the result of human errors such as lack of training, lack of attention or using wrong elements (components or ingredients), etc.

Managing Alarms and Spare Parts

FIG. 1, block 18 relates to processes managing alarms and spare parts.

MT's software currently available provides trending software with alarms to trip when a technology reaches a certain level or threshold announcing an asset's condition that needs attention. This is done individually as technologies are not integrated to trip others.

Currently, each technology's alarm is set either statistically, using ISO reference numbers or using historically data. For those manufacturing plants with thousands of assets, this approach represents a very large task as every asset will have one or more alarms per each technology. When considering the number of testing points per assets multiplied by the number of measuring technologies, the resulting number representing the number of alarms to set, could turn out to be extremely large, rendering this task too large and time consuming to implement.

Alarm levels are typically set according to asset's horse power (HP) and frame size in conjunction with other technical parameters. No financial parameters are considered for setting alarms levels.

To improve this situation, every alarm can be set uniformly for all technologies by setting angle of growth (tangent) for each asset's group. When a graph starts trending upwardly, it creates an angle with the average or baseline. When this angle exceeds a certain degree, then an alarm is tripped. In this manner, one can set the angle of growth once according to the asset's criticality or priority group and then apply it to all technologies without having to set each alarm individually. The alarm angle can be assigned by users such as executives, senior and plant managers giving them another maintenance strategic tool they can use to get involved in the maintenance processes.

Figure 2:
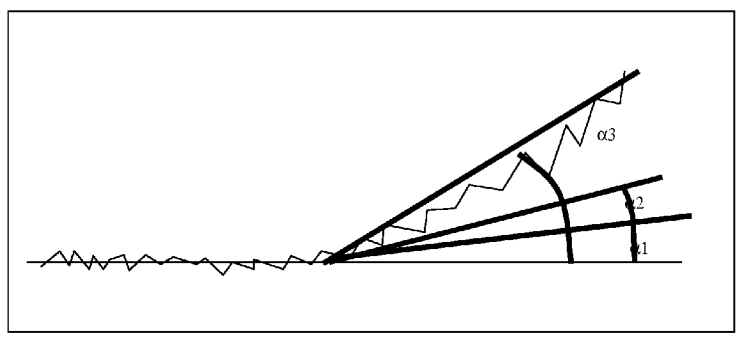
FIG. 2 shows a graph of an Alarm Angle Growth

FIG. 2 shows three alarm angle growth ($\alpha 1$, $\alpha 2$, $\alpha 3$) applied to an asset's trending parameter. In this example, the most critical asset were set to have an alarm angle growth of $\alpha 1$ of 7 degrees, a medium critical asset set to have an alarm angle growth of $\alpha 2$, of 20 degrees while a low critical asset set to have an alarm angle growth of $\alpha 3$ of 35 degrees. If there are more criticality or priority groups, then more alarm angles can be set. In this particular case, the alarm will trip when the trend goes above angle form between baseline and $\alpha 3$ as this is a low criticality asset.

Confirming Alarms

Once a measuring technology trips an alarm, the need to determine its severity is urgent and critical. Software currently available does not gather different technologies' alarms in an integrative, consecutive or coordinating manner.

If one waits for the other technologies to trip an alarm during their normal testing frequency (schedule), a failure could occur in between those times rendering MT testing worthless.

For example, if a vibration alarm tripped and a complimentary technology such as oil analysis is set up quarterly, one would have to wait three months to confirm the vibration alarm with oil analysis. Needless to say that this could result in a more severe damage leading to higher and unnecessary maintenance losses.

Another problem is that not all alarms tripped are due to wear and stress levels increasing on assets. Sometimes, an alarm may trip due to load change, a sensor overload or human error collecting data. Those situations also do need to be confirmed with complimentary MTs as transient and insignificant events can create wasted efforts and losses.

To correct and compensate for these situations, once the initial measuring technology trips an alarm, this alarm needs to issues a warning flag indicating the need to use additional MTs in a timely and sequential manner as determined by asset's integrative chart. Now the technologies are integrated to confirm that an asset's condition has changed.

Figure 3:
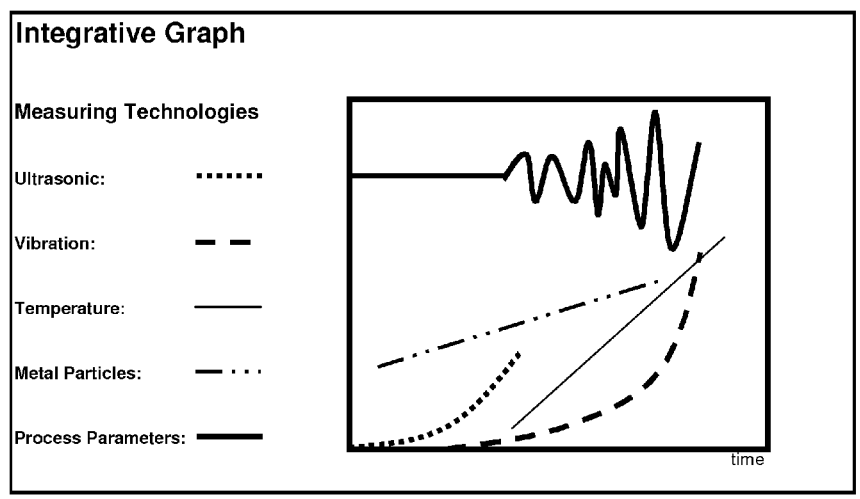
FIG. 3 shows an Integrative Graph

An Integrative Chart or graph is one where measuring technologies are integrated and displayed versus time as shown in FIG. 3 where 5 MTs (ultrasonic, vibration, temperature, metal particles found in oils and process parameters are depicted as their trends increased in time.

To develop this graph, the standard units of measurement are multiplied by a factor to allow for a clear display of all of the measurement technologies graphs vs. time in one single chart. The multiplying factor will vary from technology to technology but should be the same once it is calculated. The time variable doesn't need a multiplying factor as it is important to know the real time when the different MT trends started, the rate of growth. Using this chart to find the point in which the MT doesn't accurately follow the growth any longer and the point in time in which the following technology continues the trend is very important to know and understand.

Using this chart one can visually observe which was the MT that originated the first trend. In addition, one can see which MT followed more closely the wear process as it progresses towards its failure point. The earliest trend will provide the longest information for planning and scheduling R&R project for the asset being trended.

Understanding the successions of the technologies in time provides a tool to determine which technology to use first and most frequently and which ones to use for corroborating or confirming trends in the most effective and fastest manner. In addition to requesting the use of other technologies to confirm an asset's condition, other methodologies within the same technology can be added which are normally considered too expensive or time consuming to do on a regular and periodic basis. For example, in addition to vibration, ultrasonic and oil analysis, chromatography, particle count and viscosity oil tests could be requested to supplement the other technologies.

Increasing or stopping confirmation tests Once the original alarm is confirmed with other technologies, then the decision to either increase testing or stop testing has to be made. This decision is based on the desire for continuing testing to gain a better knowledge of the wear mode, understanding that doing so further increases maintenance losses. A decision for increasing or stopping testing can be aided by providing the cost of asset breakdown vs. cost of implementing measurement work orders. It may not be economically efficient to increase testing costs when a breakdown loss is less than the cost of the work order. On the other hand, when the cost of a breakdown is high, it is critical to reach a decision whether to continue testing or not as management has the tendency of postponing R&R Project activities because they may be under the false expectations that continuing testing the asset condition provides some sort of protection from a breakdown. Many times other internal, upstream or downstream assets end up breaking down because a decision was never reached.

Alarm Process: Parts Management/Searching and Procuring R&R Parts

Searching for a replacement/repairing part as soon as an alarm trips ensures its immediate procurement avoiding logistic losses resulting from searching, locating and testing the part when the line is down. This is accomplished by flagging a CMMS or printing a part searching request when a technology trips and alarm and this alarm is further confirmed.

Alarm Process: Adjusting Spare Lead Time

For those items known for having a long lead time, the alarm levels must be adjusted to compensate for the longer time needed for ordering and procuring spare parts. For these cases, the alarm angle growth is adjusted to trip the alarm as soon as a slight change in the trend is noticed providing in this manner a longer time for procuring the long lead time part.

The alarm angle could be set to be the same as the group of highest criticality. Typically, the assets with the highest TMP&L are the ones that tend to have the longer lead times and the ones which are of most concerned. Using the TMP&L Asset list ensures that those items are checked ahead of those with smaller TMP&L reduces the possibility of maintenance losses. The lead time can be obtained from OEM or from historical purchasing data or software such as CMMS.

Managing R&R Projects

FIG. 1, block 20 relates to processes for managing R&R Projects which includes maintenance activities that can be planned and scheduled.

Currently, maintenance management uses daily meetings, bulleting boards, emails, CMMS software and several measurement technologies software to communicate the status of different maintenance activities. In some plants, the only way to find out about the progress of a R&R Project is by actually walking to the repair site. Needless to say having so many sources of information is cumbersome and confusing, resulting in unnecessary delays and increasing the chances for errors which results in higher losses.

While it is very important to plan and schedule maintenance activities, it is also very important to ensure that every user has updated knowledge about the status of the R&R Project as it is being implemented because changes, modifications, problems or concerns arise before or during a shutdown. Even though they are important, changes are not properly communicated or may go undocumented because there is not a user friendly and easily accessible source for documenting maintenance related information. Another problem related to maintenance documentation and management is that very little information gets input on the "how to" perform R&RP activities. This results in lost opportunities for developing training material such as R&R project standard operating procedures (SOP) that can be used for training newcomers or revising and upgrading some old methodologies.

Users need tools for managing the documentation and communications of R&R projects in a more effective and efficient manner. Managing R&R Projects requires a single source that can collect, make accessible, in a simple and useful manner all of the maintenance documentation and communications among users.

Dividing the R&R Project into four different stages allows us to gather and dispose information and documentation in a more effective and efficient manner. The four stages for R&R Project are: 1) Requesting work order, 2) Planning and scheduling, 3) Implementing R&RP and 4) Post Implementation.

1) Requesting Work Order

Many times maintenance work is not approved by upper management because they are concerned about the profitability of the plant rather than the conditions of the assets. A line down is a line that is not producing profits. If upper management were made aware of the economical consequences of not shutting a line down for R&RP using maintenance financial data and work order metrics, they would have a better understanding and would see the need for planning and scheduling maintenance work at the most convenient and profitable time.

FIG. 4 illustrates how the information for preparing the request (a work order or report) of a R&RP is collected, assembled, entered, displayed and used. It includes:

Integrative chart and MT graphs trending upwardly to show growth reaching alarm levels. The trending graphs show how each technology has evolved independently (in this particular example only one technology graph is shown). The integrative chart shows how each technology correlates to others vs. time.

Each of the measuring technology graphs show upwards or downwards trends which tend to be confusing for those not knowledgeable. In the cases of downward trends, it is necessary to calculate the reverse function to change it to an upward trend.

Request work order includes metrics/asset information: Date of first alarm and date of R&R Project requested or submitted to measure time elapse between both. Type of work order task (R&R, R&RP, M, I). Task origin/purpose (MPP). Type of asset, location, serial number, etc.: (i.e. gearbox, motor, pump, blower, etc., line x, S#123).

Also included is the calculation of higher probable consequences of no action such as:

Higher probability of repair losses (i.e. asset breaking down when no coverage is available); Higher probability of downstream equipment losses (i.e. debris contaminating hydraulic fluids); Higher probability of upstream equipment losses (i.e. motor burning up when load locked up); Higher probability of internal equipment/component losses (i.e. burnt controller motherboard). Including No Action Losses as the consequences of what could happen if nothing is done.

Replacement cost; Loss/Profit probability consequences of no action; Loss probability due to R&R maintenance activities: (spare is not available); Loss/Profit probability due to maintenance planning: (spare is available but R&R not scheduled); Loss/Profit probability due to production scheduling: (spare is available and R&R is scheduled); Profits Probability: to include above results and SMP&L value; Calculating same Loss/Profit probability consequences of no action for other alarmed assets on same line/area where R&RP is requested. It is also important to include financial metrics such as: calculating and measuring actual hard and soft maintenance losses and profits, calculating and measuring actual RRATC, comparing Actual MP&L with the Total MP&L probability estimated. Calculating all other metrics such as differential MP&L, Variant MP&L, etc.

It is also important to document the people who are responsible for making decision on what gets requested and what gets scheduled. Manager responsible for R&R WO planning approval: check if approved or denied; Manager responsible for R&R WO scheduling approval: check if approved or denied. This allows for trending the number of requests, approvals or denied maintenance actions.

2) Planning and Scheduling

The current approach to planning and scheduling work orders is having dedicated planners and schedulers do the necessary preparation work previous to a shutdown. The purpose of this approach is to reduce taking time from technicians who should be attending assets instead of looking for parts. While this approach is efficient in certain industries such as electrical and nuclear utilities, it has not provided the expected results in other industries where the planner and scheduler ends up performing many other tasks not pertaining to the intended duties and obligations of planner and scheduler.

Providing the tools and framework for every technician to plan and schedule their own work is an improved way for preparing the R&R Project work as the majority of technicians already have vast hands on experience in implementing projects from the design stage all the way to its completion. In addition to regular planning and scheduling activities, users need to ensure that:

a) Entire line or area is considered for the shutdown and
b) SOP is assessed for completion and content.

a) Managing Line/Area Shutdown

When measuring technologies confirmed that an asset condition has worsened and a R&R project request work order has been approved for an asset, it is important to consider the condition of all other assets which will be down when the original R&R project takes place. In this manner, all assets can be repaired or replaced or improved at once avoiding repeating shutdowns. Sometimes the sum of too many minor issues can affect quality as well as a malfunctioning critical asset.

Interconnecting and displaying all assets as part of a plant layout of all systems physically interconnected allows for a quick view of assets interaction and how assets condition may affect one another. If systems, subsystems and components are assigned to different individuals as they typically are, they know that they need to visually check their assigned system, subsystem or component and update such information.

Gathering asset MT trends to check their conditions, all improvement (I) work orders, all 5S4M and 5S4P project work order per line or area to be shutdown and include them in R&R project work order for adding to the task to be planned and scheduled.

b) Assessing SOP

During the work order development, SOP was either completed or delayed. If delayed, the shutdown provides a unique opportunity to revise and update the SOP. SOP should contain the following information. Obtaining, making, improving and procuring the SOP with list of all procedures and components needed for asset's R&R activities. Listing third party suppliers needed to perform task; listing skills needed to perform task; tools and parts list needed for task; checking/requesting parts and tools availability and kitting. Inspecting kit prior to work; reviewing, creating and improving R&RP SOP to show how to perform work, troubleshooting/Repair and replacement work; time estimate per task based on previous experience or SPC data available; developing general templates (different storage media) for each activity and reference manuals such as OEM or national electric code (NEC).

3) Implementing R&R Project

It is important to maintain updated the status of the R&R Project so users can follow the progress or any issues that develops. Using the RRATC for describing each of the components as the project gets implemented is very important. Include the following: Status of Planning and Scheduling Activities vs. standards, continuous status update as in progress, yes or no progress; Engineer/technician responsible for R&R activities; changes that occur along the way.

4) Post R&R Project Implementation

While this stage is typically reserved for cleaning and putting tools back, it is very important that add the following processes to turn the R&R Project as a learning experience. They are: a) lessons learned, b) researching, c) developing training tools, d) troubleshooting hints and e) suggestions, f) post metric comparison a) Lessons learned: every delay, every mistake is an opportunity to learn from and to avoid during the next R&RP. Describing the different problems encountered and how they were solved or eliminated. The purpose of this process is to take errors and mistakes as opportunities instead of being taken as punishment. As long as errors are documented and used to avoid future occurrences, they can be used as lessons to be learned from.

b) Researching: Using a 5Y (Five Why) problem solving method for obtaining knowledge from disassembling a worn out component and performing a wear cause analysis (WCA) and from troubleshooting experience by subsequently asking why a breakdown on an asset occurred. For example when a key piece of equipment was removed during an R&R project, the following questions need to be answered. Why did the equipment wear? Because the circuit board voltage was oscillating. Why did the circuit voltage oscillating? Because it overheated. Why did it overheat? Because it wasn't getting enough air. Why was it not getting enough air? Because the filter wasn't changed. Why was the filter not changed? Because there was no preventive maintenance schedule to do so.

c) Training tools can be developed for repair/replacement/troubleshooting techniques using the experience gained during the R&RP. Performing components' Wear Cause Analysis (WCA), documenting findings from WCA, determining which technologies or modifications are necessary for detecting wear effectively and efficiently. These tools can take the shape of books, films, pictures, etc. and are to be used as elements to improve the capacity of technical personnel.

d) Troubleshooting hints obtained from technicians in the field when actually performing the R&RP tasks or from the WCA. Many times an indication of wear comes from a change of color or a voltage drop at a component level. Documenting this findings can be extremely valuable for avoiding future failures or reducing repair times.

e) Suggestions are requested for better procedures, researching and improving R&R Project with new techniques and technologies, using more effective and efficient components or methods, better training, requesting OEM's feedback to review and update R&R activities (how to), providing or proposing new ideas for methods and procedures.

f) Post R&R Project Metrics: the following metric provide a good idea about the success of the R&R Project. Comparing completion date with date measurement technology trending started; correlate R&R work order with measurement work order; estimated execution times vs. real execution times. Metrics to trend and calculate technician's performance such as measuring number of projects completed, difficulty of each project completed, quality of the project, etc.

Managing R&R

FIG. 1, block 22 relates to processes for managing R&R activities which includes all activities that can not be planned and/or scheduled.

R&R work orders and activities are currently documented on paper, boards and many times only communicated verbally during after-the-fact maintenance and production meetings used to address emergency maintenance activities and machine related quality and production problems. Sometimes they are entered in commercially available software to track down downtime or a CMMS where they get entered but very seldom used for analysis as it is known to be not friendly user report generator. A framework for documenting and communicating information regarding R&R is needed.

Many times, breakdown details are not properly documented or detailed enough because there is not an established process. Many times assets are "permanently patched" to allow production to continue running but as they are undocumented, they tend not to be scheduled for proper repair. This situation results in missed opportunities to eliminate sources of maintenance losses as patches tend to be only a short term solution. A framework and process for providing the capacity for managing R&R activities by reducing and mitigating its effects and for avoiding their reoccurrence through communications and information sharing is needed.

The following information needs to be collected, entered, displayed and used for managing R&R work orders and R&R activities. Dividing the R&R into three different stages allows us to gather and dispose information and documentation in a more effective and efficient manner. The three stages for R&R are: 1) requesting work order, 2) Implementing R&R and 3) Post Implementation.

1) Requesting work order for R&R needs to be more detailed oriented with information pertaining to the origin of the call and classified under some of the work order types.

2) Implementing R&R by including status of current R&R events immediately after the repair is completed and using the RRATC to keep everyone informed on repair stage.

It is important to maintain updated the status of the R&R Project so users can follow the progress or any issues that develops. Using the RRATC for describing each of the components as the project gets implemented is very important. Include the following: Status of Planning and Scheduling Activities vs. standards, continuous status update as in progress, yes or no progress; Engineer/technician responsible for R&R activities; changes that occur along the way.

3) Post R&R Work

There are several processes used to ensure that every events from the R&R Project serves as a learning experience. They are: a) lessons learned, b) researching, c) developing training tools, d) troubleshooting hints and e) suggestions, f) post metric comparison a) Lessons learned: every delay, every mistake is an opportunity to learn from and to avoid during the next R&R. Describing the different problems encountered and how they were solved or eliminated. The purpose of this process is to take errors and mistakes as opportunities instead of being taken as punishment. As long as errors are documented and used to avoid future occurrences, they can be used as lessons to be learned from.

b) Researching: Using a 5Y problem solving method for obtaining knowledge from RFCA/FMEA and from troubleshooting experience: An example follows with the problem that a key piece of equipment failed. Why did the equipment fail? Because the circuit board burned out. Why did the circuit board burn out? Because it overheated. Why did it overheat? Because it wasn't getting enough air. Why was it not getting enough air? Because the filter wasn't changed. Why was the filter not changed? Because there was no R&R Project maintenance schedule to do so.

c) Training tools for repair/replacement/troubleshooting using in house experience. Performing components' Root Failure Cause Analysis (RFCA) consisting of disassembling a repaired or replaced unit, documenting findings from RFCA, determining which technologies or modifications are necessary for detecting wear again in a effectively and efficiently. These tools can take the shape of books, films, pictures, etc. and are to be used as elements to improve the capacity of technical personnel.

d) Troubleshooting hints obtained from technicians in the field when actually performing the R&R tasks or from the RFCA/FMEA. Many times, certain events are predecessor of failures and by documenting, they can be used by others.

e) Suggestions are prompted for better procedures, researching and improving R&R work with new techniques and technologies, using more effective and efficient components or methods, better training, requesting OEM's feedback to review and update R&R activities (how to), providing or proposing new ideas for methods and procedures.

f) Post R&R work order metrics: The following metrics provide a good idea about the success of R&R activities. Comparing completion date with date measurement technology trending started; correlate R&R work order with measurement work order; estimated profit and losses with real profit and losses; estimated execution times vs. real execution times from past repairs or replacements. Metrics to trend and calculate technician's performance such as measuring number of repairs successfully and timely accomplished, difficulty of each R&R completed, quality of workmanship, etc.

Managing Maintenance Processes

FIG. 1, block 24 relates to managing, integrating and coordinating a multiplicity of maintenance processes such as managing work order tasks and metrics, alarms related processes, managing R&R and R&RP. A maintenance process of interest can be selected for analysis or for requesting information.

Feedback

FIG. 1, block 26 relates to providing process feedback.

As maintenance information is typically kept at the floor level, executives and plant managers typically don't get involved nor understand what happens with the maintenance of assets and as result, they don't know how to better invest their maintenance budgets. In addition to the MP&L metrics, having the information and documentation readily available, allows users to get any maintenance data as it develops and without having to rely on someone else' comments. This feedback ensures that executives supporting maintenance process as they gain understanding of the variables that develops when performing maintenance activities.

Another objective of the feedback loop is to provide metrics obtained from the floor that can be compared with maintenance financial metrics calculated in block 12, FIG. 1.

In addition, users such as executives and managers need to know pertinent information regarding an asset, line or area shutdown before they can approve planning and scheduling activities for a R&R Project. Only when they are in control of the right information, executives and managers can properly evaluate the situation and as result support the maintenance function and their efforts to implement projects instead of fixing breakdowns.

Software and Computer

Many software packages are available for maintenance. Among them, CMMS and those developed and used by the measurement technologies and integrators of technologies are the most frequently found in manufacturing plants. None of the software currently available provides a source for entering integrative data to facilitate analysis for identifying the sources of maintenance losses and to provide the results in a concise, easy and flexible manner.

Figure 5:
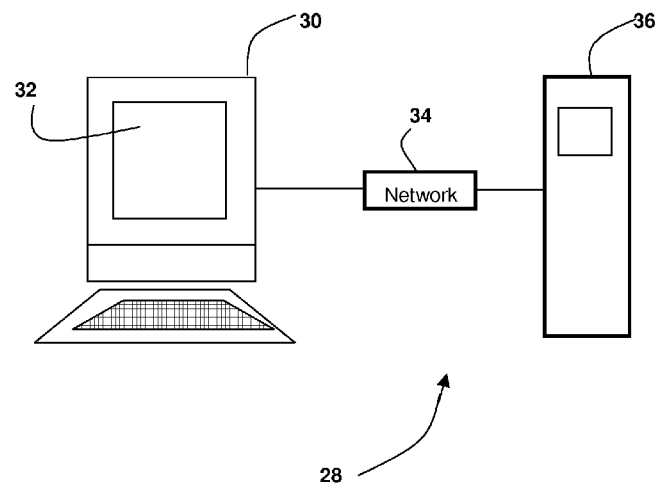
FIG. 5 shows a Computer System

FIG. 5 illustrates system 28 for eliminating maintenance losses in accordance with the present invention. System 28 is configured to provide a user with a number of operation and decision making instructions which the user can follow.

To facilitate the analysis process and to direct less experienced users, computer 30 can include graphical display 32 instructions. The user can follow the instructions. The computer can also be configured to receive and store data entered by the user and to interact with database 36 over network 34. The present invention is not limited to the use of a computer, however. A computer is one way in which the method of the present invention can be applied.

Figure 6:
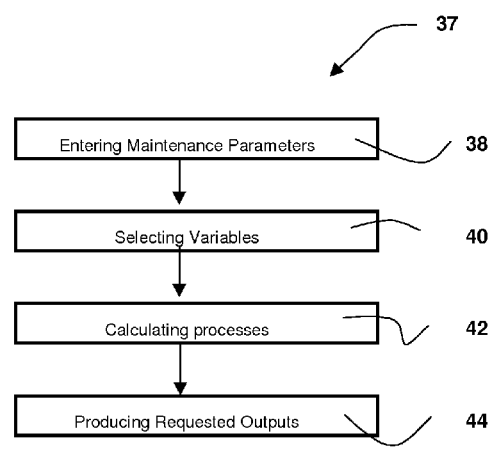
FIG. 6 shows a Software Diagram

FIG. 6 illustrates flowchart 37 of a method for eliminating sources of maintenance losses in accordance with the present invention. In general, instructions representative of the method shown in flowchart 37 are provided by computer 30 to a user through graphical displaying 32. Preferably, the computer instructs the user to input data and follow the instructions for the blocks shown in FIG. 6.

Correspondingly, computer 30 can provide an input field or display field for receiving or displaying the instructions of each block. The user responds to the instructions by inputting a response to the computer. This can be done with a keyboard or other inputting means. The computer then provides further instructions to the user based on the user's inputted responses. The computer need not understand the data inputted by the user. The computer may perform some analyses to insure data has been inputted and that it has the right formatting. Thereafter, the computer provides the next set of instructions with the corresponding input fields.

FIG. 6, block 38 shows a step for entering maintenance parameters. These parameters include: replacement cost of assets, data (hours, time and costs) for RRATC (logistic, troubleshooting, R&R activities, testing and start up); losses selected assigned to an asset; method selected for calculating HMP&L; method selected for calculating SMP&L; losses selected as related to an asset and losses associated with each SMP&L; profits selected (eliminating, reducing, avoiding and mitigating) as assigned to an asset's HMP&L and SMP&L; modifications needed to implement each 5S4M/5S4P/MT task, detailing how to perform each 5S4M/5S4P/MT task; tools needed to perform 5S4M/5S4P/MT tasks; specifying which storage media needed for each 5S4M/5S4P/MT task (software or hardware); answers operator's capacity question; estimated task frequency and time to complete 5S4M/5S4P/MT tasks; time to revise task frequency; scheduling SOP time for 5S4M/5S4P/MT tasks; number of MT available in house and number of MT available through third party provider; decision to continue or stopping testing; decision to issue spare part availability check if wear is confirmed; answering spare availability question; answering question about length of time to obtain spare part; answering to question about time required to order spare part; requested scheduled date and manager responsible; R&RP and R&R scheduling status as in completed, in progress and what percent needed for completion; scheduled date if approved or not and manager responsible; TMP&L; AMP&L; metrics for work orders; date of first alarm; date of project requested or submitted; losses due to no action: spare availability; losses/profits probability due to maintenance planning and no production scheduled; losses/profits probability due to production scheduling; minimum R&R losses; medium R&R losses; maximum R&R losses; consequences of upstream equipment losses; consequences of downstream equipment losses; consequences of internal component losses; type of wear origin or stress as maintenance, process or people; type of work order as R&R, R&RP, R&R PS, R&R M, R&R I, R&R IP, 5S4M, 5S4P, enabling work order, Root failure based type work orders, OEM and regulatory type work orders; work orders per line or area to be shut down; information for SOP; R&RP status; planning stages by checking part in house, labor assigned, tools required, parts kitted; scheduling engineer responsible for R&RP activities; manager's name responsible for planning approved or denied; manager's name responsible for scheduling approved or denied; RRATC status; lessons learned; answers to 5Y questions; solution to correct the 5th Y; WCA/RFCA request and documentation; WCA/RFCA results and conclusions; OEM feedback from WCA/RFCA conclusions; troubleshooting hints gained during R&RP; troubleshooting hints from WCA/RFCA; suggestions from maintenance activities; OEM feedback about R&RP and R&R activities; OEM feedback for new components and upgrades available; executive summary metrics and comments; operator's R&R status (time of call, time of arrival, completion time, returned to production, time production fully operational); operator's reason for call; symptoms developed prior to call; technician's R&R status (time of call, time of arrival, completion time, returned to production, time production fully operational); technician's reason for call; operators and technician comments; condition/status asset found; action taken #1, #2 and #3; measurements and compare with estimated wear condition; if failure occurred because of analysis error or oversight or if failure was too sudden to be picked up by MT; time in life cycle of asset (such as new installation, stable system, near decommission).

Figure 7:
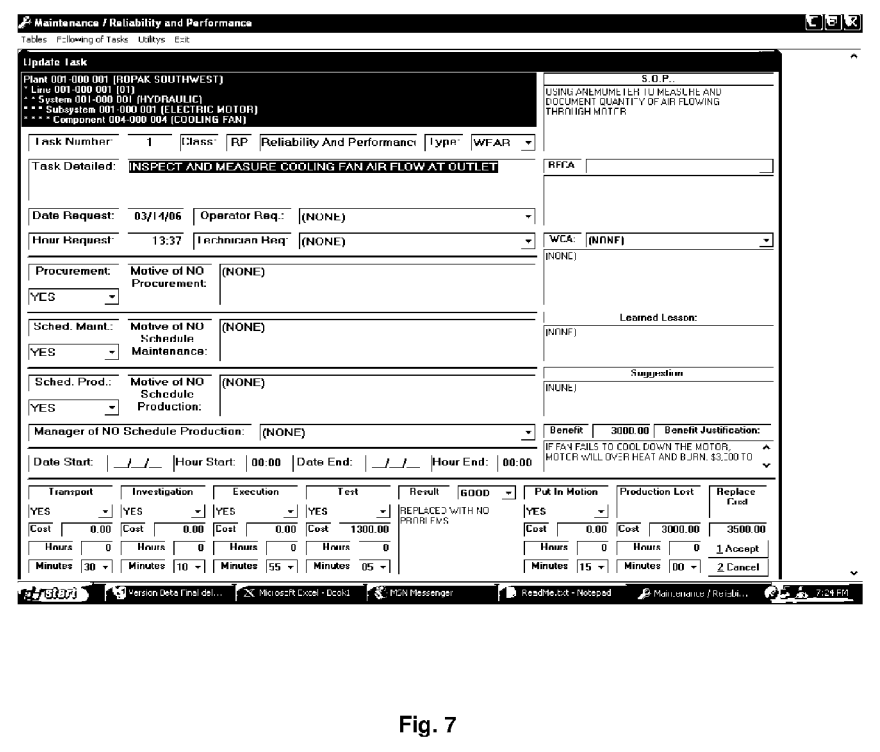

FIG. 7 illustrates a software screen printout providing a structure and display for entering data.

FIG. 6, block 40 shows the next step in the operation is for the user to select proper variables such as: growth angle alarm degree for each criticality or priority group; confirming wear or stress; increasing or stopping testing after confirmation; benefits from continuing testing; losses from continuing testing; best MT from integrative table and best complimentary MT for confirming alarms; values for profit and losses; letter or number for each criticality or priority group; a priority to each 5S4M/5S4P; order of 5S4M/5S4P according to management assignment; a quantity of 5S4M/5S4P for each criticality or priority group; asset type and a line to each asset; assets from lines and lines from areas according to plant layout; list of assets ranked according to TMP&L value.

Figure 8:
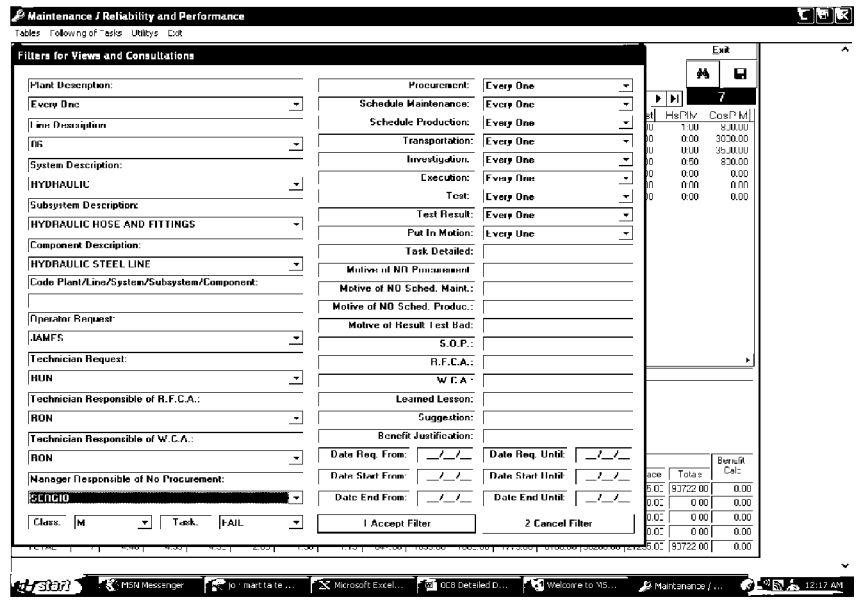
FIG. 8 shows an example of a Software Screen for Analysis Request

FIG. 6, block 42 shows the next step in the operation is the computer calculates the following values: line and/or area's TMP&L; ranking lines and/or areas according to their TMP&L; Line/Area MP&L; Variant MP&L; Universal MP&L; Differential MP&L; total losses due to HMP&L; total losses due to RRATC; total losses due to SMP&L; total losses due to TMP&L; 5S4M/5S4P/MT profits and losses using RRATC and the difference between profits and losses; total number of work orders including all modification types; total number of work orders completed grouped according to the following types: R&R, R&RP, M and I; the division of a compiled list into "Criticality or priority groups"; a number of points needed to satisfy reliability condition and monthly frequency; actual MP&L once wear is confirmed and for profits and losses; difference and AMP&L vs. cost of work order; if time to obtain spare part is larger than time to schedule R&RP; if time to obtain spare is larger; then alarm is adjusted to criticality or priority group 1 or A for tighter growth angle; actual MP&L; trends and importing them from different MT; conversion of charts and upwardly trends; total RRATC and time lapse; the difference between all estimated probabilities with actual metrics; the difference between MT trending and work order start date; all estimated probabilities with actual metrics; to assign MT to criticality or priority groups; multiplying factor for integrative chart per each asset type; forecasting, statistical functions such as average, max, min, std deviation, etc. using data available; reliability function (such as Weibull, exponential, logarithmic, etc.) to approximate wear process; desired reliability; desired confidence level and desired confidence interval and to provide the calculations for a report inquire. FIG. 8 shows a software screen example showing some of the calculations that can be performed when selecting different variables of interest.

Figure 9:
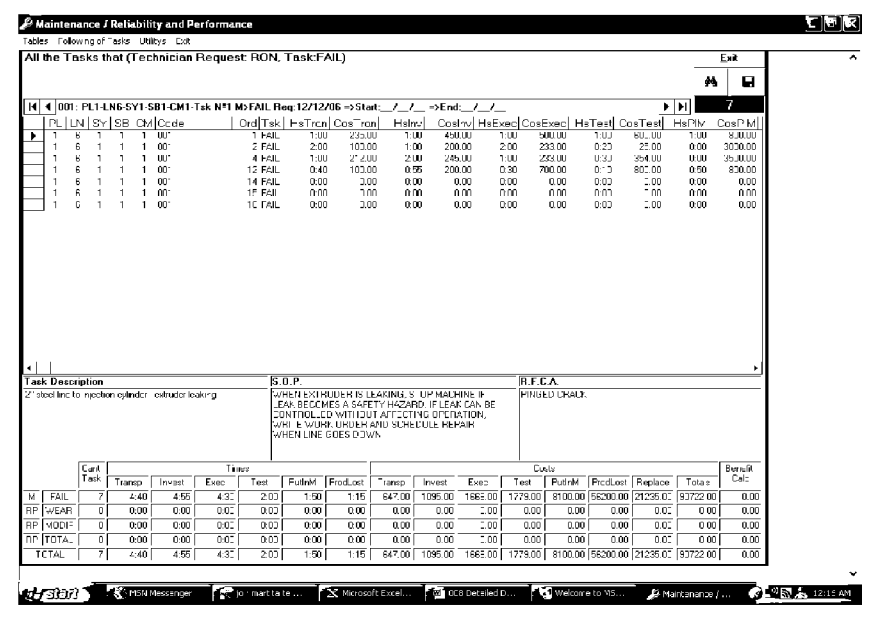

FIG. 6, block 44 shows the next step in the operation is producing work orders, displaying information, providing feedback from analyzing data according to parameters selected. FIG. 9 shows the result of the variables selected on this software screen when selecting the following choices: Hydraulic system, hydraulic hose and fittings as subsystem, hydraulic steel line as component description, James as operator request, Ron as Technician, technician responsible for RFCA and Technician responsible for WCA and Sergio as Manager responsible of No procurement (logistic); class M is selected to classify the type of tasks as Maintenance (MPP) and task type is fail (another way of saying R&R that was not a planned and scheduled project). Once the accept filter icon shown in FIG. 8 is clicked, the outcome results are shown in FIG. 9.

While the best mode for carrying out the invention has been described in detail, those familiar with the art to which this invention relates will recognize various alternative designs and embodiments for practicing the invention as defined by the following claims.

What is claimed is:

1. A process for simultaneously addressing multiple sources of maintenance profits and losses, the process comprising:
   a. entering, using a computer, historical data regarding one or more assets and if historical data is not available entering estimated data regarding the one or more assets;
   b. classifying and calculating at least one Maintenance Profit & Loss parameter for the one or more assets using said computer;
   c. generating a ranking list of the one or more assets using said at least one Maintenance Profit & Loss parameter;
   d. developing and optimizing work order tasks based on the ranking list, wherein those one or more assets with the highest rank maintenance profit and loss have work order tasks developed from 5S for Machine/Maintenance (5S4M), 5S for Production/Process (5S4P), and measurement technologies (MT) that are larger in number of said work order tasks and are according to asset type of said at least one or more assets and further wherein those one or more assets with the lowest rank maintenance profit and loss have work order tasks developed from 5S4M/5S4P/MT that are lower in number of said work order tasks and are according to asset type of said at least one or more assets;
   e. using a slope generated by trends in said measurement technologies by said asset type to trip alarms that identify problems, wherein the higher at least one asset is in said ranking list, the tighter the slope required to trip an alarm; further wherein the lower at least one asset is in said ranking list, the broader the slope required to trip said alarm;
   f. generating an integrative work order including at least said developed work order tasks, an integrative graph displaying said trends in said measurement technologies, said tripped alarms, and said at least one Maintenance Profit & Loss parameter;
   g. managing at least testing, trending, and repairs based on said integrative work order;
   h. classifying said work order tasks according to scheduled or unscheduled repairs, consequences and task origins including Machine Process People (MPP);
   i. using data from said work order for analyzing said multiple sources of maintenance profits and losses and generating tools for training, analysis and communication; and
   j. using said computer for displaying a number of instructions and providing feedback for users to address said multiple sources of maintenance profits and losses.

2. A process of claim 1 wherein said entering historical data and estimated data regarding the one or more assets comprises:
   a. machine and production related data;
   b. critical components and their spare parts list;
   c. production and machine assigned to operators and technicians; and
   d. Maintenance Profit & Loss parameters.

3. A process of claim 2 wherein said Maintenance Profit & Loss parameters comprises:
   a. classifying, forecasting and calculating probabilities of maintenance profits and losses (MP&L);
   b. classifying, forecasting and calculating probabilities of Hard MP&L
   c. classifying, forecasting and calculating probabilities of Soft MP&L;
   d. classifying, forecasting and calculating probabilities of Total MP&L
   e. using Total MP&L to rank assets criticality;
   f. classifying line, area, section, and plant MP&L;
   g. classifying Variant MP&L;
   h. classifying Universal MP&L;
   i. classifying Total MP&L;
   j. classifying Differential MP&L;
   k. classifying Max MP&L;
   l. classifying, forecasting and calculating the MP&L of work order tasks; and
   m. classifying, forecasting and calculating repair and replace activities into its repair or replace actual time components (RRATC).

4. A process of claim 1 wherein said classifying and calculating the at least one Maintenance Profit & Loss parameter using said computer comprises:
   a. deriving profits and losses caused from the times spent in each of the repair logistics and activities;
   b. calculating the profits and losses caused by a breakdown;
   c. calculating and forecasting Variant MP&L, Universal MP&L, Total MP&L Differential MP&L, Max MP&L; and
   d. calculating an individual contribution of each of the repair logistics and activities to time periods such as weeks, months, quarters, or years.

5. A process of claim 1 wherein generating the ranking list of the one or more assets using said at least one Maintenance Profit & Loss parameter comprises:
   a. an ascending or descending order listing assets according to said Maintenance Profit & Loss;
   b. line, area, section, and plant's Maintenance Profit & Loss;
   c. probabilities of maintenance profit and losses (MP&L); and
   d. probabilities of Hard MP&L
   e. probabilities of Soft MP&L.

6. The process of claim 1, wherein said 5S for Machine/Maintenance (5S4M) comprises:
   a. shinning, whereas shinning means activities to make a machine or maintenance component or system clean by a technician;
   b. simplifying, whereas simplifying means activities to make a machine or maintenance component or system simpler for technicians to repair or replace;
   c. sorting, whereas sorting means activities to make a machine or maintenance components or system organized to be readily accessible for technicians;
   d. standardizing, whereas standardizing means activities to make a machine or maintenance components or systems standard for a technician; and
   e. statistic, forecasting and reliability functions (SFRF), whereas SFRF means activities that use the computer to predict and forecast failures, estimate profit and loss parameters, for a machine, or maintenance component or system.

7. The process of claim 1 wherein said 5S for Production/Process (5S4P) comprises:
   a. shinning, whereas shinning means activities to make a production or process component or system clean by an operator;
   b. simplifying, whereas simplifying means activities to make a production or process component or system simpler for technicians to repair or replace;

c. sorting, whereas sorting means activities to make a production or process components or systems organized to be readily accessible for technicians;

d. standardizing, whereas standardizing means activities to make a production or process components or systems standard for a technician; and e. statistic, forecasting and reliability functions (SFRF), whereas SFRF means activities that uses the computer to predict and forecast failures, estimate profit and loss parameters for production or process components or system.

8. The process of claim 1, wherein said integrating a multiplicity of measurement technologies (MT) comprises:

b. using an ultrasonic alarm;

c. using a vibration alarm;

d. using a metal particles alarm;

e. using a temperature alarm; and f. using a process parameters alarm.

9. The process of claim 1 wherein optimizing work order tasks comprises:

a. setting a quantity and type of 5S for machine/maintenance (5S4M) work order tasks based on asset criticality and profit and loss parameters;

b. setting a quantity and type of 5S for production/process (5S4P) work order tasks based on asset criticality and profit and loss parameters;

c. setting a quantity and type of measuring technologies (MT) work order tasks based on asset criticality and profit and losses parameters;

d. setting 5S4M, 5S4P and MT work order tasks frequencies based on asset criticality and profit and loss parameters; and e. measuring and adjusting profit and losses generated from each work order task implemented.

10. The process of claim 1 wherein managing at least testing, trending and repairs on said work order comprises:

a. using the integrative graph of measurement technologies to observe said alarms;

b. using one or more tripped alarms to determine and confirm imminent wear or failure; and c. using a wear or failure confirmation to request and manage said work order for repair and replace.

11. The process of claim 1 wherein classifying said work order according to scheduled or unscheduled repairs, consequences and task origins comprises:

a. time at which a breakdown occurred and details;

b. time maintenance took to answer production request;

c. time maintenance took to troubleshoot to find the source of breakdown;

d. time maintenance took searching for support, tools, instruments;

e. time maintenance took to complete the repair or replace activities;

f. time maintenance took to ready machine for production start up;

g. time production took to make a deliverable product;

h. time maintenance took to complete all details of repair and replace activities;

i. time maintenance took to complete all details of root cause failure analysis (RFCA);

j. time maintenance or production took to complete all details of 5Why analysis (5Y);

k. developing machine, people, processes (MPP) process for classifying task origin and intentions;

l. developing MPP metrics for determining origin of maintenance profit and loss;

m. classifying and measuring repair and replace actual time activities (RRATC); and n. classifying tasks as per R&R, R&RP and measuring and improving types.

* * * * *